US009363687B2

(12) United States Patent
Seo et al.

(10) Patent No.: US 9,363,687 B2
(45) Date of Patent: Jun. 7, 2016

(54) METHOD AND DEVICE FOR TRANSMITTING RECEPTION CONFIRMATION IN WIRELESS COMMUNICATION SYSTEM

(75) Inventors: Dong Youn Seo, Anyang-si (KR); Joon Kui Ahn, Anyang-si (KR); Suck Chel Yang, Anyang-si (KR); Min Gyu Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 159 days.

(21) Appl. No.: 13/984,752

(22) PCT Filed: Feb. 10, 2012

(86) PCT No.: PCT/KR2012/001005
§ 371 (c)(1),
(2), (4) Date: Aug. 9, 2013

(87) PCT Pub. No.: WO2012/108720
PCT Pub. Date: Aug. 16, 2012

(65) Prior Publication Data
US 2013/0322343 A1 Dec. 5, 2013

Related U.S. Application Data

(60) Provisional application No. 61/441,646, filed on Feb. 10, 2011, provisional application No. 61/471,703, filed on Apr. 5, 2011, provisional application No. 61/509,123, filed on Jul. 19, 2011, provisional application No. 61/538,111, filed on Sep. 22, 2011.

(51) Int. Cl.
*H04W 24/02* (2009.01)
*H04L 1/12* (2006.01)
*H04L 1/18* (2006.01)

(52) U.S. Cl.
CPC ............. *H04W 24/02* (2013.01); *H04L 1/1854* (2013.01); *H04L 1/1864* (2013.01); *H04L 1/1812* (2013.01); *H04L 2001/125* (2013.01)

(58) Field of Classification Search
CPC ................... H04W 72/0406; H04W 72/0446; H04W 24/02; H04L 1/18; H04L 5/00
See application file for complete search history.

(56) References Cited

U.S. PATENT DOCUMENTS

2011/0149813 A1* 6/2011 Parkvall ............... H04B 7/2656
370/280
2011/0176461 A1* 7/2011 Astely .................. H04B 7/2656
370/280

(Continued)

FOREIGN PATENT DOCUMENTS

CN  1692605  11/2005
EP  2200208  6/2010

(Continued)

OTHER PUBLICATIONS

3GPP Technical Specification (TS 36.300 V8.5.0 (May 2008)), 3rd Generation Partnership Project;Technical Specification Group Radio Access Network; Evolved Universal Terrestrial Radio Access (E-UTRA) and Evolved Universal Terrestrial Radio Access Network (E-UTRAN) Overall description; Stage 2 (Release 8), May 2008.*

(Continued)

*Primary Examiner* — Chi H Pham
*Assistant Examiner* — Shailendra Kumar
(74) *Attorney, Agent, or Firm* — Lee, Hong, Degerman, Kang & Walmey; Jonathan Kang; Michael Monaco

(57) ABSTRACT

According to one embodiment, a method for transmitting acknowledgement/not-acknowledgement (ACK/NACK) of a user equipment in a wireless communication system. Includes: receiving uplink-downlink (UL-DL) configuration 5 information on a plurality of subframes; receiving data in at least one subframe among the plurality of subframes; configuring ACK/NACK for the received data; and transmitting the ACK/NACK through a UL subframe.

19 Claims, 18 Drawing Sheets

(56) References Cited

U.S. PATENT DOCUMENTS

| | | | | |
|---|---|---|---|---|
| 2011/0243066 A1* | 10/2011 | Nayeb Nazar | .......... | H04L 1/007 370/328 |
| 2013/0195066 A1* | 8/2013 | Lee | ....................... | H04L 1/1607 370/329 |

FOREIGN PATENT DOCUMENTS

| | | |
|---|---|---|
| KR | 10-2010-0116139 | 10/2010 |
| KR | 10-2010-0126593 | 12/2010 |
| WO | 2009/124079 | 10/2009 |
| WO | WO 2010/069422 A1 * | 6/2010 |
| WO | 2010/123267 | 10/2010 |

OTHER PUBLICATIONS

Ericsson, ST-Ericsson, PUCCH Design for CA, 3GPP TSG RAN WG1 Meeting #61bis, Dresden, Germany, Jun. 28-Jul. 2, 2010, R1-103506.*

Samsung, Carrier Aggregation; DL/ UL structure common radio configuration, 3GPP TSG-RAN2#72 meeting, Jacksonville, US, Nov. 15-19, 2010, R2-106439.*

Nokia Siemens Networks, Nokia, PUCCH Resource allocation for Carrier Aggregation 3GPP TSG RAN WG1 Meeting #62, Madrid, Spain, Aug. 23-27, 2010, R1-104436.*

Huawei, HiSilicon, ACK/NACK feedback with channel selection for TDD, 3GPP TSG RAN WG1 Meeting #63, Jacksonville, Florida, USA, Nov. 15-19, 2010, R1-106152.*

Panasonic, UL ACK/NACK transmission on PUCCH for carrier aggregation, 3GPP TSG-RAN WG1 Meeting #57, May 4-8, 2009 in San Francisco, USA, R1-091744.*

3GPP Technical Specification (TS 36.300 V10.1.0 (Sep. 2010)), 3rd Generation Partnership Project;Technical Specification Group Radio Access Network; Evolved Universal Terrestrial Radio Access (E-UTRA) and Evolved Universal Terrestrial Radio Access Network (E-UTRAN) Overall description; Stage 2 (Release 10), Sep. 2010.*

Samsung, "Carrier Aggregation; DL/ UL structure common radio configuration," 3GPP TSG-RAN2 #72 meeting, Tdoc R2-106439, Nov. 2010, 9 pages.

Nokia Siemens Networks, et al., "PUCCH Resource allocation for Carrier Aggregation," 3GPP TSG RAN WG1 Meeting #62, R1-104436, Aug. 2010, 2 pages.

The State Intellectual Property Office of the People's Republic of China Application Serial No. 201280008636.X, Office Action dated Aug. 4, 2015, 5 pages.

* cited by examiner

METHOD AND DEVICE FOR TRANSMITTING RECEPTION CONFIRMATION IN WIRELESS COMMUNICATION SYSTEM

CROSS-REFERENCE TO RELATED APPLICATIONS

This application is the National Stage filing under 35 U.S.C. 371 of International Application No. PCT/KR2012/001005, filed on Feb. 10, 2012, which claims the benefit of U.S. Provisional Application Ser. No. 61/441,646, filed on Feb. 10, 2011, 61/471,703 filed on Apr. 5, 2011, 61/509,123 filed on Jul. 19, 2011 and 61/538,111 filed on Sep. 22, 2011, the contents of which are all hereby incorporated by reference herein in their entirety.

TECHNICAL FIELD

The present invention relates to wireless communications, and more particularly, to a method and apparatus for transmitting acknowledgement/not-acknowledgement (ACK/NACK) for indicating reception confirmation in a wireless communication system supporting carrier aggregation.

BACKGROUND ART

One of the most important requirements of a next generation wireless communication system is to support a high data rate. For this, various techniques such as multiple input multiple output (MIMO), cooperative multiple point transmission (CoMP), relay, etc., have been under research, but the most fundamental and reliable solution is to increase a bandwidth.

However, a frequency resource is in a saturation state at present, and various schemes are partially used in a wide frequency band. For this reason, in order to ensure a broadband bandwidth to satisfy a required higher data rate, a system is designed such that a basic requirement which allows separate bands to operate respective independent systems is satisfied, and a carrier aggregation (CA) is introduced. In concept, the CA aggregates a plurality of bands into one system. In this case, a band that can be independently managed is defined as a component carrier (CC).

To support growing transmission capacity, it is considered in the latest communication standard (e.g., 3GPP LTE-A or 802.16m) to expand its bandwidth to 20 MHz or higher. In this case, a wideband is supported by aggregating one or more CCs. For example, if one CC corresponds to a bandwidth of 5 MHz, four carriers are aggregated to support a bandwidth of up to 20 MHz. As such, a system supporting carrier aggregation is called a carrier aggregation system.

In the conventional carrier aggregation system, all carriers use the same type of frames. That is, all carriers use a frequency division duplex (FDD) frame or a time division duplex (TDD) frame. However, in a future carrier aggregation system, it is considered to use a different type of frame for each carrier. In addition, it is also considered to use a different uplink (UL)-downlink (DL) configuration while a TDD frame is used in a group of some carriers among carriers constituting the carrier aggregation system.

Meanwhile, a wireless communication system can use hybrid automatic repeat request (HARQ) in which retransmission data is transmitted when an error occurs in transmitted data upon receiving reception confirmation information on transmitted data, that is, acknowledgement/not-acknowledgement (ACK/NACK). In an HARQ process, a receiving side can perform decoding by combining data originally transmitted in a transmitting side with retransmitted data.

There is a need for a method of performing HARQ when the carrier aggregation system uses a different types of frame for each carrier or when some carrier groups use a TDD frame while using a different UL-DL configuration. More specifically, there is a need for a method of transmitting ACK/NACK by a user equipment.

SUMMARY OF INVENTION

Technical Problem

The present invention provides a method and apparatus for transmitting acknowledgement/not-acknowledgement (ACK/NACK) in a carrier aggregation system.

Technical Solution

According to an aspect of the present invention, a method for transmitting acknowledgement/not-acknowledgement (ACK/NACK) of a user equipment in a wireless communication system is provided. The method includes: receiving uplink-downlink (UL-DL) configuration information on a plurality of subframes; receiving data in at least one subframe among the plurality of subframes; configuring ACK/NACK for the received data; and transmitting the ACK/NACK through a UL subframe, wherein the plurality of subframes correspond to the UL subframe, wherein each of the plurality of subframes is any one of a flexible subframe and a default DL subframe fixed to a DL subframe, and the flexible subframe is a subframe that can be configured as a UL subframe or a DL subframe by the UL-DL configuration information, and wherein an ACK/NACK payload size indicating an information bit size of the ACK/NACK is determined on the basis of the number of default DL subframes, the number of flexible subframes, and a transmission mode of the plurality of subframes.

In the aforementioned aspect of the present invention, the ACK/NACK payload size may be the number of bits, which is equal to a product of the maximum number of codewords that can be transmitted in each subframe and a sum of the number of default DL subframes and the total number of flexible subframes included in the plurality of subframes.

In addition, the ACK/NACK payload size may be the number of bits, which is equal to a product of the maximum number of codewords that can be transmitted in each subframe and a sum of the number of default DL subframes and the number of default DL subframes recognized by the user equipment as a DL subframe among flexible subframes included in the plurality of subframes.

In addition, the ACK/NACK payload size may be the number of bits, which is equal to a sum of a product of the total number of flexible subframes included in the plurality of subframes and the maximum number of codewords that can be transmitted in the flexible subframe and a product of the number of default DL subframes included in the plurality of subframes and the total number of codewords that can be transmitted in the default DL subframe.

In addition, the plurality of subframes and the UL subframe may be subframes of a primary cell.

In addition, the plurality of subframes may be subframes of a secondary cell, and the UL subframe may be a subframe of the primary cell.

In addition, among the plurality of subframes, at least one subframe may be a subframe of a primary cell, and the remaining subframes may be subframes of a secondary cell.

In addition, the UL-DL configuration information on the plurality of subframes may be received through a primary cell.

In addition, if semi-persistently scheduled data is received only in one default DL subframe among the plurality of subframes, the ACK/NACK may be transmitted using a physical uplink control channel (PUCCH) format 1a or 1b.

In addition, if scheduled data is received through a physical downlink control channel (PDCCH) only in one default DL subframe among the plurality of subframes and a downlink assignment index (DAI) included in the PDCCH is 1, the ACK/NACK may be transmitted using a PUCCH format 1a or 1b.

In addition, if only a PDCCH requesting an ACK/NACK response is received only in one default DL subframe among the plurality of subframes and a DAI included in the PDCCH is 1, the ACK/NACK may be transmitted using a PUCCH format 1a or 1b.

In addition, if data semi-persistently scheduled without a corresponding PDCCH is further received in one default DL subframe among the plurality of subframes, the ACK/NACK may be transmitted using channel selection which uses a PUCCH format 1a or 1b.

In addition, the primary cell may use a frequency division duplex (FDD) frame in which DL transmission and UL transmission are performed in different frequency bands.

In addition, the secondary cells may use a TDD frame in which DL transmission and UL transmission are performed in the same frequency band at different times.

In addition, the UL-DL configuration information may be transmitted through a PDCCH for scheduling first subframes.

In addition, first subframes and a second subframe may be separated by 4 subframes.

According to another aspect of the present invention, there is provided a user equipment including: a radio frequency (RF) unit for transmitting and receiving a radio signal; and a processor coupled to the RF unit, wherein the processor receives UL-DL configuration information on a plurality of subframes, receives data in at least one subframe among the plurality of subframes, configures ACK/NACK for the received data, and transmits transmitting the ACK/NACK through a UL subframe, wherein the plurality of subframes correspond to the UL subframe, wherein each of the plurality of subframes is any one of a flexible subframe and a default DL subframe fixed to a DL subframe, and the flexible subframe is a subframe that can be configured as a UL subframe or a DL subframe by the UL-DL configuration information, and wherein an ACK/NACK payload size indicating an information bit size of the ACK/NACK is determined on the basis of the number of default DL subframes, the number of flexible subframes, and a transmission mode of the plurality of subframes.

Advantageous Effects

According to the present invention, acknowledgement/notacknowledgement (ACK/NACK) can be transmitted in a robust manner to a physical downlink control channel (PDCCH) reception error in a carrier aggregation system in which resource allocation can be flexibly changed for a downlink and an uplink.

MODE FOR INVENTION

Long term evolution (LTE) of the third generation partnership project (3GPP) standard organization is a part of an evolved-universal mobile telecommunications system (E-UMTS) using an evolved-universal terrestrial radio access network (E-UTRAN). The LTE employs an orthogonal frequency division multiple access (OFDMA) in a downlink and employs single carrier-frequency division multiple access (SC-FDMA) in an uplink. LTE-advance (LTE-A) is an evolution of the LTE. For clarity, the following description will focus on the 3GPP LTE/LTE-A. However, technical features of the present invention are not limited thereto.

Figure 1:
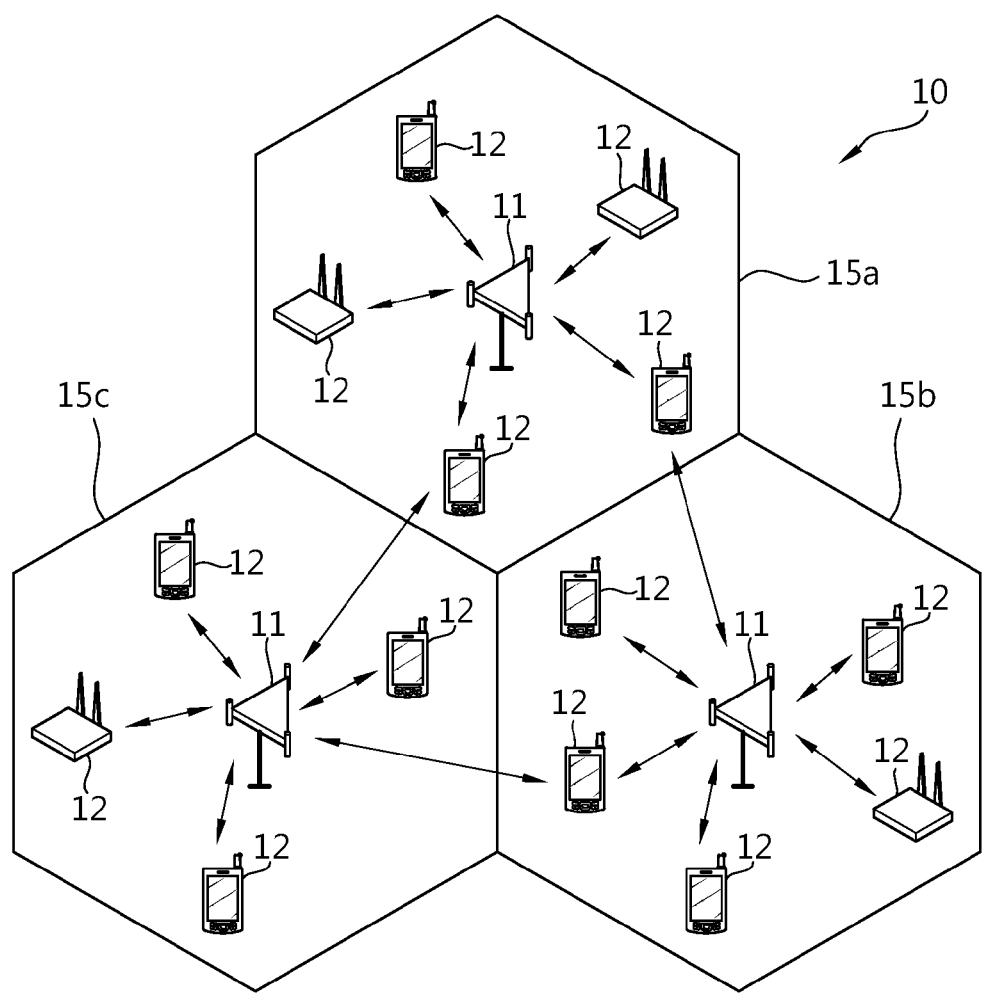
FIG. 1 shows a wireless communication system.

FIG. 1 shows a wireless communication system.

Referring to FIG. 1, a wireless communication system 10 includes at least one base station (BS) 11. Each BS 11 provides a communication service to a specific geographical region. The geographical region can be divided into a plurality of sub-regions 15a, 15b, and 15c, each of which is called a sector. The BS 11 is generally a fixed station that communicates with a user equipment (UE) 12 and may be referred to as another terminology, such as an evolved node-B (eNB), a base transceiver system (BTS), an access point, an access network (AN), etc.

The UE 12 may be fixed or mobile, and may be referred to as another terminology, such as a mobile station (MS), a user terminal (UT), a subscriber station (SS), a wireless device, a personal digital assistant (PDA), a wireless modem, a hand-held device, an access terminal (AT), etc.

Hereinafter, a downlink (DL) implies communication from the BS 11 to the UE 12, and an uplink (UL) implies communication from the UE 12 to the BS 11.

The wireless communication system 10 may be a system supporting bidirectional communication. The bidirectional communication may be performed by using a time division duplex (TDD) mode, a frequency division duplex (FDD) mode, etc. When in the TDD mode, UL transmission and DL transmission use different time resources. When in the FDD mode, UL transmission and DL transmission use different frequency resources. The BS 11 and the UE 12 can communicate with each other by using a radio resource called a radio frame.

Figure 2:
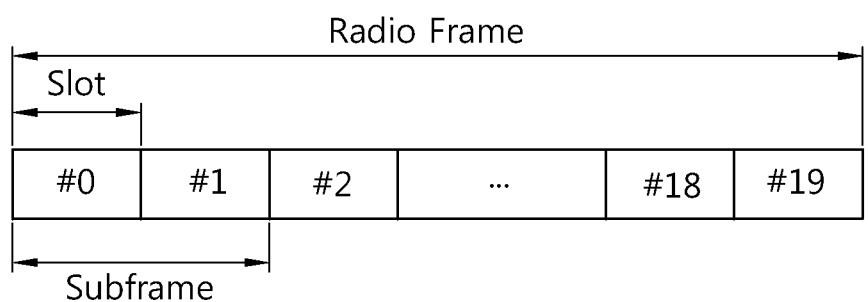
FIG. 2 shows a radio frame structure used in frequency division duplex (FDD).

FIG. 2 shows a radio frame structure used in FDD.

Referring to FIG. 2, a radio frame used in FDD (hereinafter, an FDD frame) consists of 10 subframes in a time domain. One subframe consists of 2 slots in the time domain. One subframe may have a length of 1 millisecond (ms), and one slot may have a length of 0.5 ms. A time for transmitting one subframe is defined as a transmission time interval (TTI). The TTI may be a minimum unit of scheduling.

One slot may include a plurality of orthogonal frequency division multiplexing (OFDM) symbols in the time domain. Since the 3GPP LTE uses OFDMA in a downlink, one symbol period is represented with the OFDM symbol. The OFDM symbol can be referred to as other terms according to a multiple access scheme. For example, the OFDM symbol can also be referred to as an SC-FDMA symbol when SC-FDMA is used as an uplink multiple-access scheme. Although it is described herein that one slot includes 7 OFDM symbols, the number of OFDM symbols included in one slot may change depending on a cyclic prefix (CP) length. According to 3GPP TS 36.211 V8.5.0(2008-12), in case of a normal CP, one subframe includes 7 OFDM symbols, and in case of an extended CP, one subframe includes 6 OFDM symbols. The radio frame structure is for exemplary purposes only, and thus the number of subframes included in the radio frame and the number of slots included in the subframe may change variously.

Figure 3:
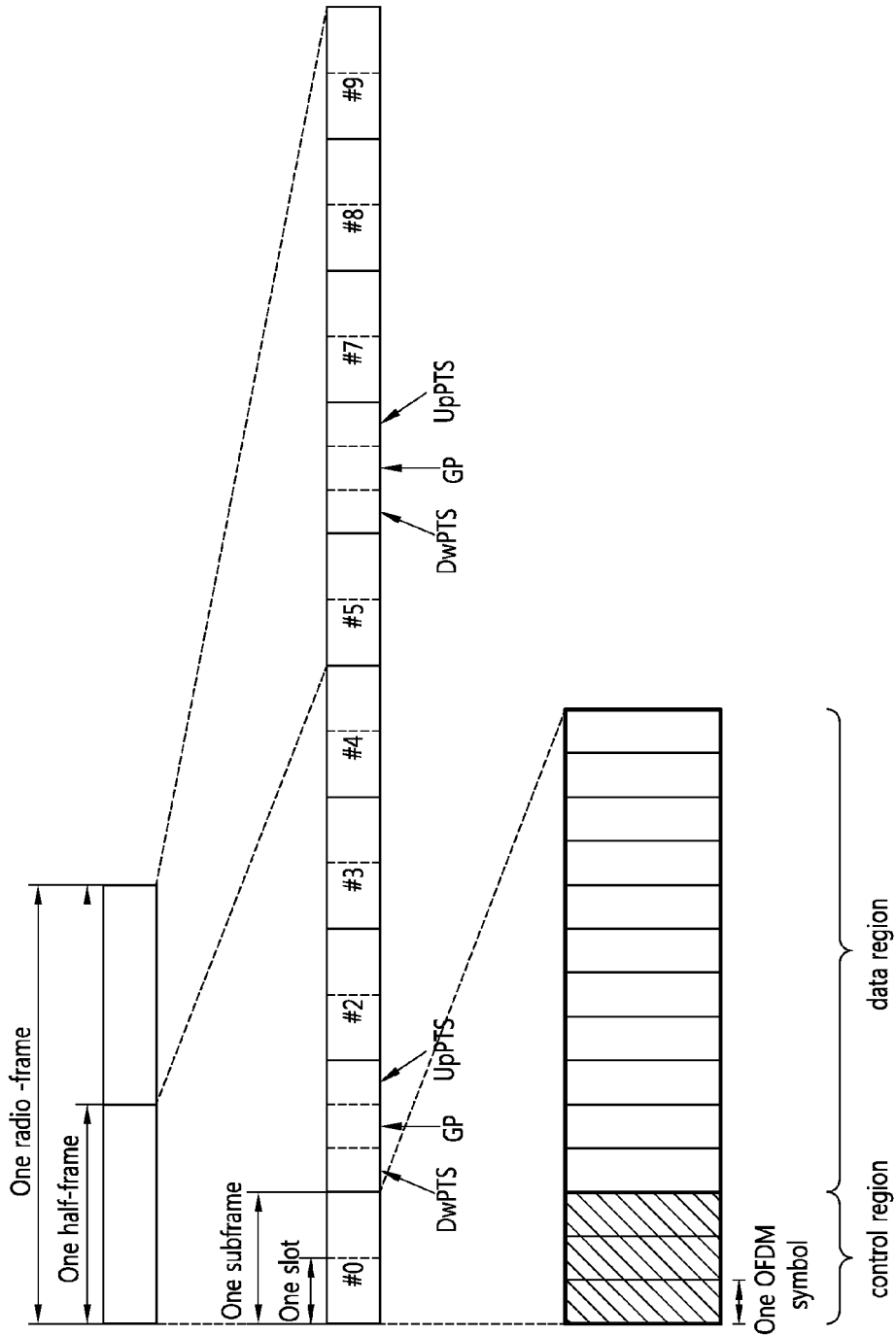
FIG. 3 shows a radio frame structure used in time division duplex (TDD).

FIG. 3 shows a radio frame structure used in TDD.

Referring to FIG. 3, a radio frame used in TDD (hereinafter, a TDD frame) consists of 10 subframes indexed from 0 to 9. One subframe consists of 2 consecutive slots. For example, one subframe may have a length of 1 ms, and one slot may have a length of 0.5 ms.

One slot may include a plurality of OFDM symbols in a time domain. Although it is described herein that one slot includes 7 OFDM symbols, the number of OFDM symbols included in one slot may change depending on a CP length. According to 3GPP TS 36.211 V8.7.0, in case of a normal CP, one slot includes 7 OFDM symbols, and in case of an extended CP, one slot includes 6 OFDM symbols.

A subframe having an index #1 and an index #6 is called a special subframe, and includes a downlink pilot time slot (DwPTS), a guard period (GP), and an uplink pilot time slot (UpPTS). The DwPTS is used in a UE for initial cell search, synchronization, or channel estimation. The UpPTS is used in a BS for channel estimation and uplink transmission synchronization of the UE. The GP is a period for removing interference which occurs in an uplink due to a multi-path delay of a downlink signal between the uplink and a downlink.

Table 1 below shows an example of a configuration of a special subframe.

TABLE 1

| Special subframe configuration | Normal cyclic prefix in downlink | | | Extended cyclic prefix in downlink | | |
|---|---|---|---|---|---|---|
| | DwPTS | UpPTS Normal cyclic prefix in uplink | Extended cyclic prefix in uplink | DwPTS | UpPTS Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In Table 1 above, $T_s=1/(30720)$ ms.

In TDD, a DL subframe and a UL subframe coexist in one radio frame. Table 2 below shows an example of a UL-DL configuration of a radio frame.

TABLE 2

| DL-UL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2 above, 'D' denotes a DL subframe, 'U' denotes a UL subframe, and 'S' denotes a special subframe. Upon receiving the DL-UL configuration from the BS, the UE can know which subframe is the DL subframe, the UL subframe, or the special subframe according to the DL-UL configuration of the radio frame.

Figure 4:
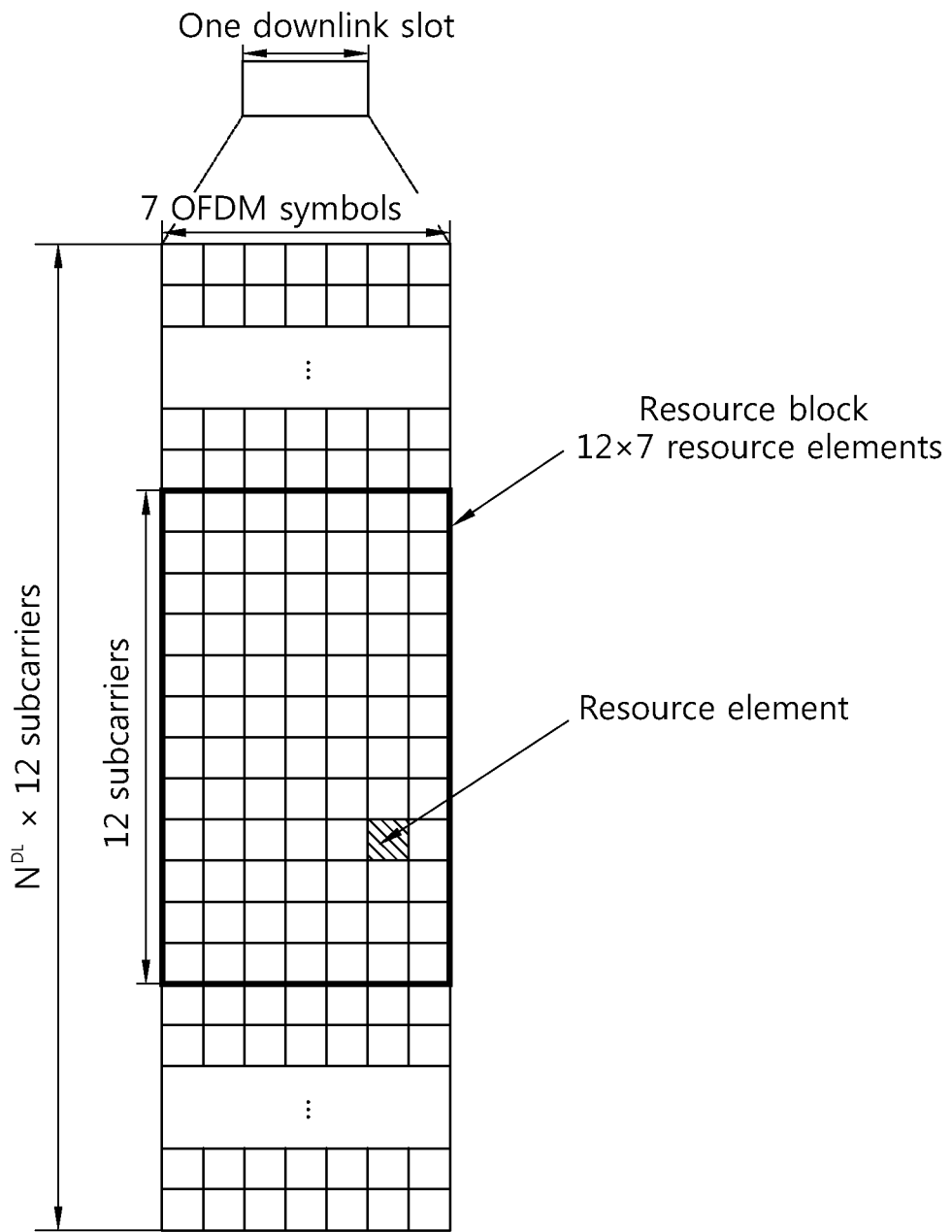
FIG. 4 shows an example of a resource grid for one downlink (DL) slot.

FIG. 4 shows an example of a resource grid for one DL slot.

Referring to FIG. 4, the DL slot includes a plurality of OFDM symbols in a time domain, and includes $N_{RB}$ resource blocks (RBs) in a frequency domain. The RB includes one slot in the time domain in a unit of resource allocation, and includes a plurality of consecutive subcarriers in the frequency domain. The number $N_{RB}$ of RBs included in the DL slot depends on a DL transmission bandwidth configured in a cell. For example, in the LTE system, $N_{RB}$ may be any one value in the range of 6 to 110. A structure of a UL slot may be the same as the aforementioned structure of the DL slot.

Each element on the resource grid is referred to as a resource element (RE). The RE on the resource grid can be identified by an index pair (k,l) within the slot. Herein, k (k=0, . . . , $N_{RB} \times 12-1$) denotes a subcarrier index in the frequency domain, and l (l=0, . . . , 6) denotes an OFDM symbol index in the time domain.

Although it is described in FIG. 4 that one RB consists of 7 OFDM symbols in the time domain and 12 subcarriers in the frequency domain and thus includes 7×12 REs, this is for exemplary purposes only. Therefore, the number of OFDM symbols and subcarriers in the RB are not limited thereto. The number of OFDM symbols and the number of subcarriers may change variously depending on a CP length, a frequency spacing, etc. The number of subcarriers in one OFDM symbol may be any one value selected from 128, 256, 512, 1024, 1536, and 2048.

Figure 5:
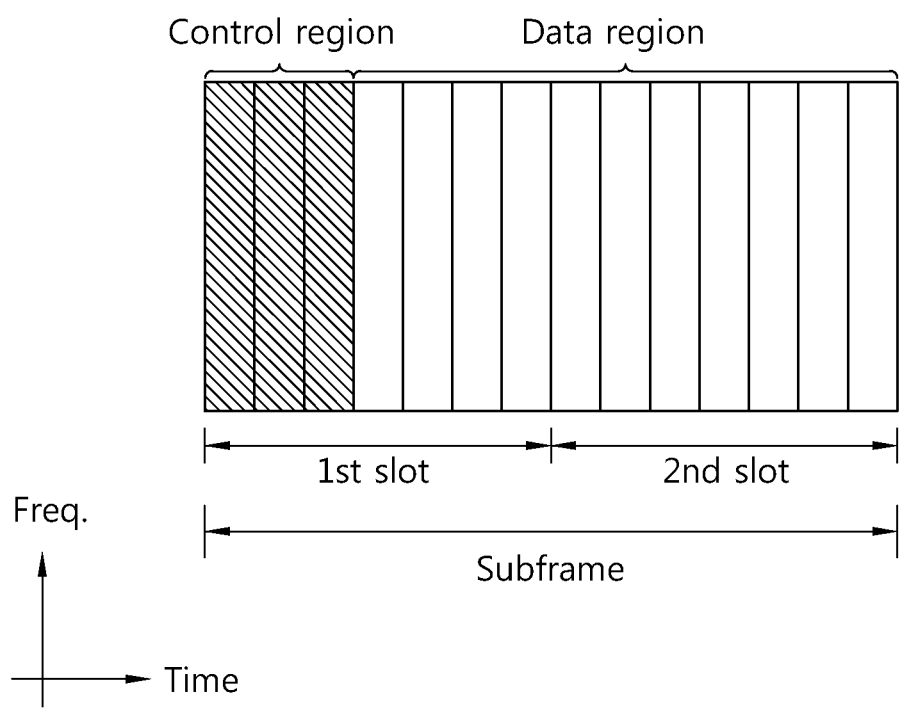
FIG. 5 shows a structure of a DL subframe.

FIG. 5 shows a structure of a DL subframe.

The subframe includes two consecutive slots. A maximum of three OFDM symbols located in a front portion of a first slot in the DL subframe correspond to a control region to which a control channel is allocated. The remaining OFDM symbols correspond to a data region to which a data channel is allocated. Herein, the control region includes 3 OFDM symbols for exemplary purposes only.

Control channels such as a physical downlink control channel (PDCCH), a physical control format indicator channel (PCFICH), a physical hybrid automatic repeat request (HARQ) indicator channel (PHICH), etc., can be allocated to the control region. A UE can read data information transmitted through the data channel by decoding control information transmitted through the PDCCH. The PDCCH will be described below in detail. The number of OFDM symbols included in the control region of the subframe can be known by using the PCFICH. The PHICH carries a hybrid automatic repeat request (HARQ) acknowledgement (ACK)/negative-acknowledgment (NACK) signal in response to the UL transmission. A physical downlink shared channel (PDSCH) can be allocated to the data region.

[PDCCH Structure]

A control region consists of a logical control channel element (CCE) stream which is a plurality of CCEs. A CCE corresponds to a plurality of resource element groups (REGs) For example, the CCE may correspond to 9 REGs. The REG is used to define mapping of a control channel to a resource element. For example, one REG may consist of four resource elements. The CCE stream denotes a set of all CCEs constituting the control region in one subframe.

A plurality of PDCCHs may be transmitted in the control region. The PDCCH is transmitted on an aggregation of one or several consecutive CCEs. A PDCCH format and the number of available PDCCH bits are determined according to the number of CCEs constituting the CCE aggregation. Hereinafter, the number of CCEs used for PDCCH transmission is referred to as a CCE aggregation level. In addition, the CCE aggregation level is a CCE unit for searching for the PDCCH. A size of the CCE aggregation level is defined by the number of consecutive CCEs. For example, the CCE aggregation level may be defined as a specific number of CCEs, where the specific number is selected from {1, 2, 4, 8}.

Table 3 below shows examples of the PDCCH format and the number of available PDCCH bits according to the CCE aggregation level.

TABLE 3

| PDCCH format | CCE aggregation level | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Control information transmitted through the PDCCH is referred to as downlink control information (hereinafter, DCI). The DCI transmits UL scheduling information (called a UL grant), DL scheduling information (called a DL grant), a UL power control command, control information for paging, control information for indicating a random access channel (RACH) response, etc.

The DCI can be transmitted with a specific format, and its usage can be defined according to each DCI format. For example, the usage of the DCI format can be classified as shown in Table 4 below.

TABLE 4

| DCI format | Contents |
|---|---|
| DCI format 0 | It is used for PUSCH scheduling. |
| DCI format 1 | It is used for scheduling of one PDSCH codeword. |
| DCI format 1A | It is used for compact scheduling and random access process of one PDSCH codeword. |
| DCI format 1B | It is used in simple scheduling of one PDSCH codeword having precoding information. |
| DCI format 1C | It is used for very compact scheduling of one PDSCH codeword. |
| DCI format 1D | It is used for simple scheduling of one PDSCH codeword having precoding and power offset information. |
| DCI format 2 | It is used for PDSCH scheduling of UEs configured to a closed-loop spatial multiplexing mode. |
| DCI format 2A | It is used for PDSCH scheduling of UEs configured to an open-loop spatial multiplexing mode. |
| DCI format 3 | It is used for transmission of a TPC command of a PUCCH and a PUSCH having a 2-bit power adjustment. |
| DCI format 3A | It is used for transmission of a TPC command of a PUCCH and a PUSCH having a 1-bit power adjustment. |
| DCI format 4 | It is used for PUSCH scheduling in one UL cell in a multi-antenna Tx mode. |

The PDCCH can be generated through the following process. A BS attaches a cyclic redundancy check (CRC) for error detection to DCI to be transmitted to a UE. The CRC is masked with an identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message transmitted through a paging channel (PCH), a paging indicator identifier (e.g., paging-RNTI (P-RNTI)) may be masked to the CRC. If the PDCCH is for system information transmitted through a DL-SCH, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC. When the C-RNTI is used, the PDCCH carries control information for a corresponding specific UE. When other RNTIs are used, the PDCCH carries common control information received by all UEs in a cell.

Thereafter, channel coding is performed on the CRC-attached control information to generate coded data. Then, rate matching is performed according to a CCE aggregation level assigned to the PDCCH format. Thereafter, the coded data is modulated to generate modulation symbols. The number of modulation symbols constituting one PDCCH may differ depending on a CCE aggregation level (i.e., one value selected from 1, 2, 4, and 8). The modulation symbols are mapped to physical resource elements (REs) (i.e., CCE to RE mapping).

In the 3GPP LTE, the UE uses blind decoding for PDCCH detection. The blind decoding is a scheme in which a desired identifier is de-masked from a CRC of a received PDCCH (referred to as a candidate PDCCH) and a CRC error is checked to determine whether the PDCCH is its own control channel. The blind decoding is performed because the UE cannot know about a specific position in a control region in which its PDCCH is transmitted and about a specific CCE aggregation or DCI format used for PDCCH transmission.

As described above, a plurality of PDCCHs can be transmitted in one subframe. The UE monitors the plurality of PDCCHs in every subframe. Herein, monitoring is an operation in which the UE attempts PDCCH decoding according to a PDCCH format.

The 3GPP LTE uses a search space to reduce an overload caused by blind decoding. The search space can also be called a monitoring set of a CCE for the PDCCH. The UE monitors the PDCCH in the search space.

The search space is classified into a common search space (CSS) and a UE-specific search space (USS). The CSS is a space for searching for a PDCCH having common control information and consists of 16 CCEs indexed with 0 to 15. The CSS supports a PDCCH having a CCE aggregation level of {4, 8}. However, a PDCCH (e.g., DCI formats 0, 1A) for carrying UE-specific information can also be transmitted in the CSS. The USS supports a PDCCH having a CCE aggregation level of {1, 2, 4, 8}.

A start point of the search space is defined differently in the CSS and the USS. Although a start point of the CSS is fixed irrespective of a subframe, a start point of the USS may vary in every subframe according to a UE identifier (e.g., C-RNTI), a CCE aggregation level, and/or a slot number in a radio frame. If the start point of the USS exists in the CSS, the USS and the CSS may overlap with each other.

In a CCE aggregation level $L \in \{1,2,3,4\}$, a search space $S^{(L)}_k$ is defined as a set of candidate PDCCHs. A CCE corresponding to a candidate PDCCH m of the search space $S^{(L)}_k$ is given by Equation 1 below.

$$L \cdot \{(Y_k+m) \bmod \lfloor N_{CCE,k}/L \rfloor\}+i \quad \text{[Equation 1]}$$

Herein, $i=0, 1, \ldots, L-1$, $m=0, \ldots, M^{(L)}-1$, and $N_{CCE,k}$ denotes the total number of CCEs that can be used for PDCCH transmission in a control region of a subframe k. The control region includes a set of CCEs numbered from 0 to $N_{CCE,k}-1$. $M^{(L)}$ denotes the number of candidate PDCCHs in a CCE aggregation level L of a given search space. In the CSS, $Y_k$ is set to 0 with respect to two aggregation levels L=4 and L=8. In the USS of the CCE aggregation level L, a variable $Y_k$ is defined by Equation 2 below.

$$k=(A \cdot Y_{k-1}) \bmod D \quad \text{[Equation 2]}$$

Herein, $Y_{-1}=n_{RNTI} \neq 0$, A=39827, D=65537, k=floor($n_s/2$), and $n_s$ denotes a slot number in a radio frame.

Table 5 below shows the number of candidate PDCCHs in the search space.

TABLE 5

| PDCCH format | The number of CCEs | The number of candidate PDCCHs in CSS | The number of candidate PDCCHs in USS |
|---|---|---|---|
| 0 | 1 | — | 6 |
| 1 | 2 | — | 6 |
| 2 | 4 | 4 | 2 |
| 3 | 8 | 2 | 2 |

Meanwhile, a DL transmission mode between a BS and a UE can be classified into 9 types as follows. The number of transport blocks or codewords included in a PDSCH in each subframe may differ according to the DL transmission mode.

Transmission mode 1: A mode in which precoding is not performed (a single antenna port transmission mode).

Transmission mode 2: A transmission mode that can be used in 2 or 4 antenna ports using SFBC (transmit diversity)

Transmission mode 3: An open-loop mode in which rank adaptation based on RI feedback is possible (open-loop spatial multiplexing). The transmit diversity is applicable when a rank is 1. A great delay CDD can be used when the rank is greater than 1.

Transmission mode 4: A mode in which precoding feedback supporting dynamic rank adaptation is applied (closed-loop spatial multiplexing).

Transmission mode 5: Multi-user MIMO.

Transmission mode 6: Closed-loop rank-1 precoding.

Transmission mode 7: A transmission mode in which a UE-specific reference signal is used.

Transmission mode 8: Dual-layer transmission using antenna ports 7 and 8, or single-antenna port transmission using the antenna port 7 or the antenna port 8 (dual-layer transmission).

Transmission mode 9: Up to 8-layer transmission using antenna ports 7 to 14.

Figure 6:
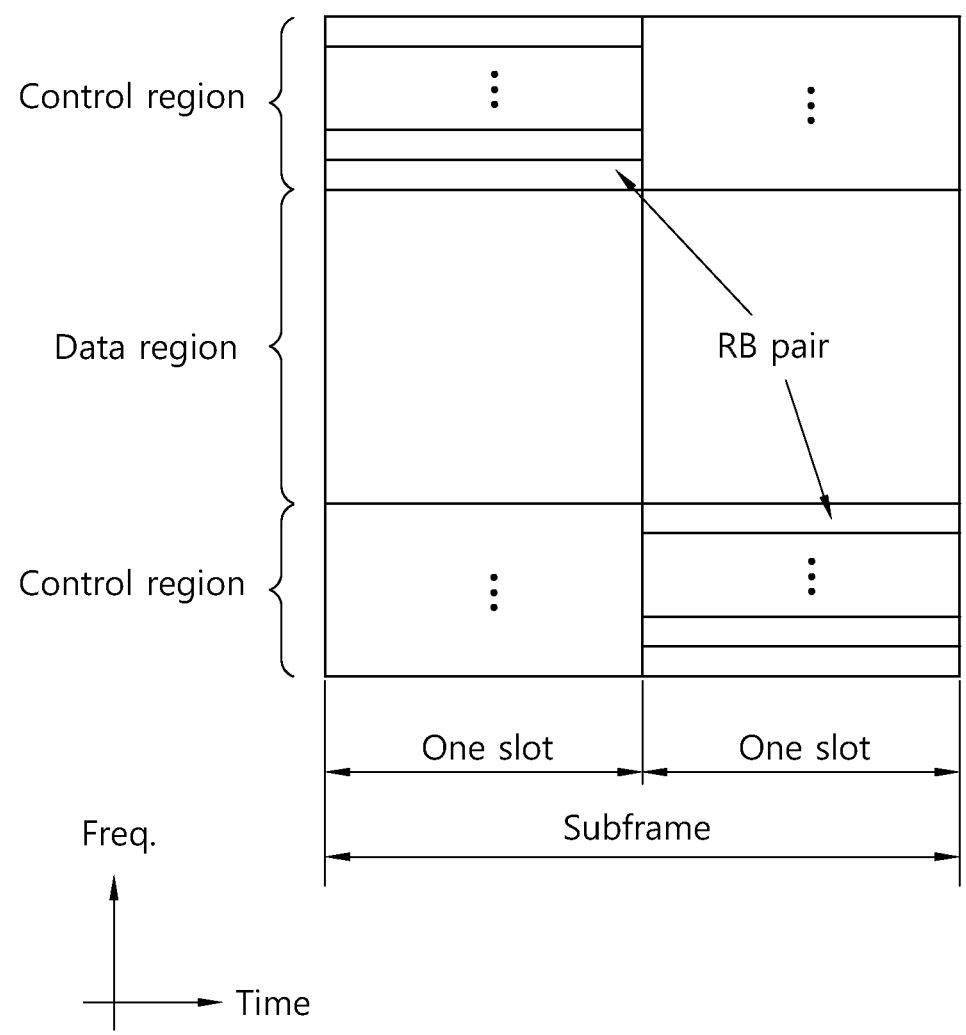
FIG. 6 shows a structure of an uplink (UL) subframe.

FIG. 6 shows a structure of a UL subframe.

Referring to FIG. 6, the UL subframe can be divided into a control region and a data region in a frequency domain. A physical uplink control channel (PUCCH) for transmitting UL control information is allocated to the control region. A physical uplink shared channel (PUSCH) for transmitting data (optionally, control information can be transmitted together) is allocated to the data region. According to a configuration, the UE may simultaneously transmit the PUCCH and the PUSCH, or may transmit any one of the PUCCH and the PUSCH.

The PUCCH for one UE is allocated in an RB pair in a subframe. RBs belonging to the RB pair occupy different subcarriers in each of a first slot and a second slot. A frequency occupied by the RBs belonging to the RB pair allocated to the PUCCH changes at a slot boundary. This is called that the RB pair allocated to the PUCCH is frequency-hopped in a slot boundary. By transmitting UL control information over time through different subcarriers, a frequency diversity gain can be obtained.

A hybrid automatic repeat request (HARQ) acknowledgement (ACK)/non-acknowledgment (NACK) and channel status information (CSI) indicating a DL channel status (e.g., channel quality indicator (CQI), a precoding matrix index (PMI), a precoding type indicator (PTI), a rank indication (RI), etc.) can be transmitted through the PUCCH. Periodic CSI can be transmitted through the PUCCH.

The PUSCH is mapped to an uplink shared channel (UL-SCH) which is a transport channel. UL data transmitted through the PUSCH may be a transport block which is a data block for the UL-SCH transmitted during a TTI. The transport block may include user data. Alternatively, the UL data may be multiplexed data. The multiplexed data may be obtained by multiplexing CSI and a transport block for the UL-SCH. Examples of the CSI multiplexed to the data may include a CQI, a PMI, an RI, etc. Alternatively, the UL data may consist of only CSI. Periodic or aperiodic CSI can be transmitted through the PUSCH.

Meanwhile, the PUCCH carries various types of control information according to a format. A PUCCH format 1 carries a scheduling request (SR). In this case, an on-off keying (OOK) scheme can be used. A PUCCH format 1a carries an ACK/NACK modulated using bit phase shift keying (BPSK) with respect to one codeword. A PUCCH format 1b carries an ACK/NACK modulated using quadrature phase shift keying (QPSK) with respect to two codewords. A PUCCH format 2 carries a channel quality indicator (CQI) modulated using QPSK. PUCCH formats 2a and 2b carry CQI and ACK/NACK. A PUCCH format 3 is modulated using QPSK, and can carry multiple ACK/NACKs and SRs.

Table 6 shows a modulation scheme and the number of bits in a subframe according to a PUCCH format.

TABLE 6

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence $r_u(n)$ is defined by Equation 3 below.

$$r_{u(n)} = e^{jb(n)\pi/4} \quad \text{[Equation 3]}$$

In Equation 3, u denotes a root index, and n denotes a component index in the range of $0 \le n \le N-1$, where N is a length of the base sequence. b(n) is defined in the section 5.5 of 3GPP TS 36.211 V8.7.0.

A length of a sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

The base sequence r(n) can be cyclically shifted by Equation 4 below to generate a cyclically shifted sequence $r(n, I_{cs})$ $$r(n, I_{cs}) = r(n) \cdot \exp\left(\frac{j2\pi I_{cs}n}{N}\right), \quad 0 \le I_{cs} \le N-1 \quad \text{[Equation 4]}$$

In Equation 4, $I_{cs}$ denotes a CS index indicating a CS amount ($0 \le I_{cs} \le N-1$).

The available CS of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 2, the total number of available CS indices of the base sequence is 6.

Now, transmission of an HARQ ACK/NACK signal in PUCCH formats 1a/1b will be described.

Figure 7:
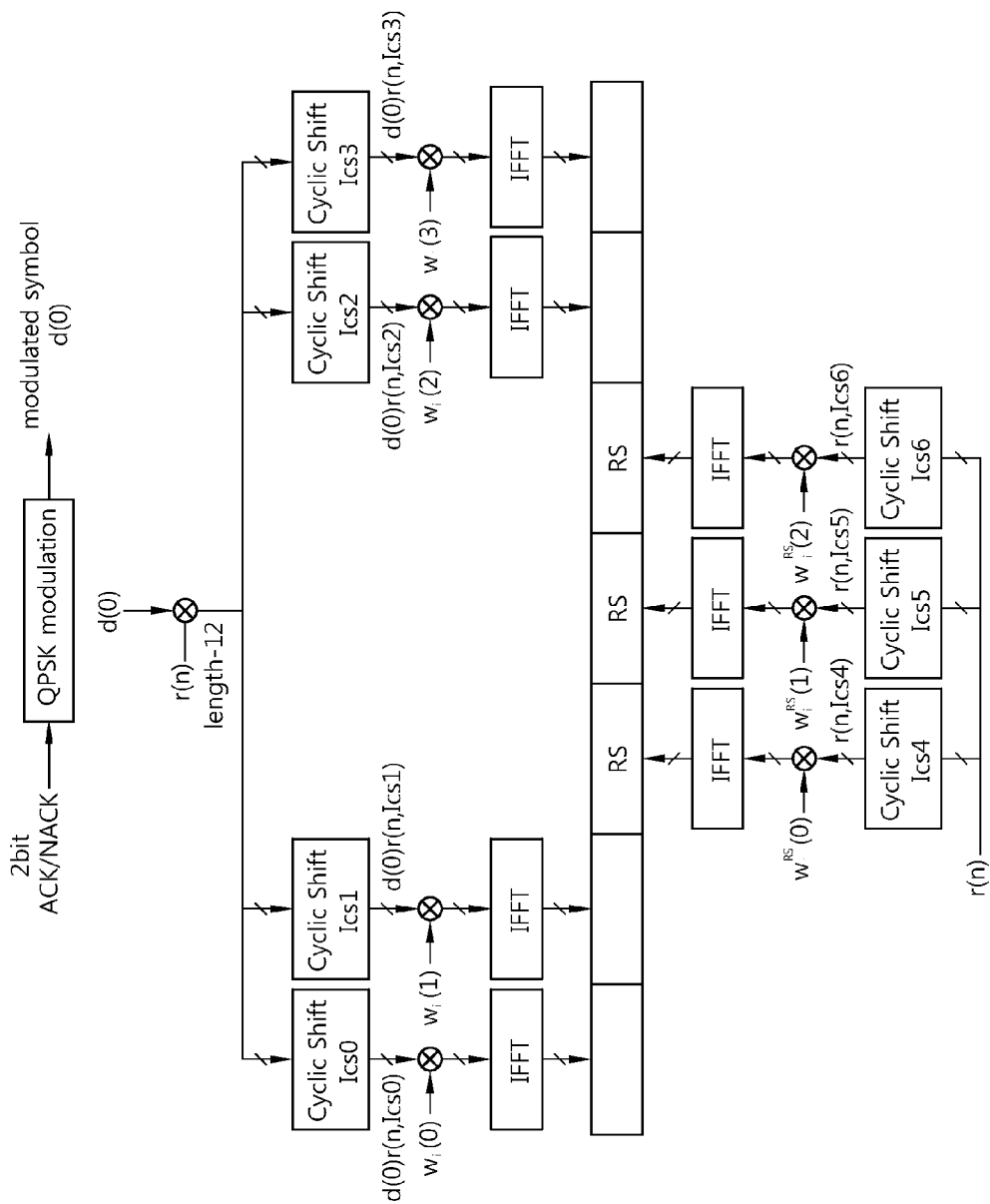
FIG. 7 shows a physical uplink control channel (PUCCH) format 1b in third generation partnership project (3GPP) long term evolution (LTE) in a normal cyclic prefix (CP) case.

FIG. 7 shows a PUCCH format 1b in 3GPP LTE in a normal CP case.

One slot includes 7 OFDM symbols. Three OFDM symbols are used as a reference signal (RS) symbol for a reference signal. Four OFDM symbols are used as a data symbol for an ACK/NACK signal.

In the PUCCH format 1b, a modulation symbol d(0) is generated by modulating a 2-bit ACK/NACK signal based on quadrature phase shift keying (QPSK). Unlike this, HARQ ACK/NACK transmitted in the PUCCH format 1a is one bit.

A CS index $I_{cs}$ may vary depending on a slot number $n_s$ in a radio frame and/or a symbol index l in a slot.

In the normal CP case, there are four data OFDM symbols for transmission of an ACK/NACK signal in one slot. It is assumed that CS indices mapped to the respective data OFDM symbols are denoted by $I_{cs0}$, $I_{cs1}$, $I_{cs2}$, and $I_{cs3}$.

The modulation symbol d(0) is spread to a cyclically shifted sequence $r(n, I_{cs})$. When a one-dimensional spreading sequence mapped to an $(i+1)^{th}$ OFDM symbol in a subframe is denoted by m(i), it can be expressed as follows.

$$\{m(0), m(1), m(2), m(3)\} = \{d(0)r(n, I_{cs0}), d(0)r(n, I_{cs1}), d(0)r(n, I_{cs2}), d(0)r(n, I_{cs3})\} \quad [1]$$

In order to increase UE capacity, the one-dimensional spreading sequence can be spread by using an orthogonal sequence. An orthogonal sequence $w_i(k)$ (where i is a sequence index, $0 \le k \le K-1$) having a spread factor K=4 uses the following sequence.

TABLE 7

| Index (i) | $[w_i(0), w_i(1), w_i(2), w_i(3)]$ |
|---|---|
| 0 | [+1, +1, +1, +1] |
| 1 | [+1, -1, +1, -1] |
| 2 | [+1, -1, -1, +1] |

An orthogonal sequence $w_i(k)$ (where i is a sequence index, $0 \le k \le K-1$) having a spread factor K=3 uses the following sequence.

TABLE 8

| Index (i) | $[w_i(0), w_i(1), w_i(2)]$ |
|---|---|
| 0 | [+1, +1, +1] |
| 1 | $[+1, e^{j2\pi/3}, e^{j4\pi/3}]$ |
| 2 | $[+1, e^{j4\pi/3}, e^{j2\pi/3}]$ |

A different spread factor can be used for each slot.

Therefore, when any orthogonal sequence index i is given, two-dimensional spreading sequences $\{s(0), s(1), s(2), s(3)\}$ can be expressed as follows.

$$\{s(0), s(1), s(2), s(3)\} = \{w_i(0)m(0), w_i(1)m(1), w_i(2)m(2), w_i(3)m(3)\}$$

The two-dimensional spreading sequences $\{s(0), s(1), s(2), s(3)\}$ are subjected to inverse fast Fourier transform (IFFT) and thereafter are transmitted in corresponding OFDM symbols. Accordingly, an ACK/NACK signal is transmitted on a PUCCH.

A reference signal of the PUCCH format 1b is also transmitted by cyclically shifting the base sequence r(n) and then by spreading it by the use of an orthogonal sequence. When CS indices mapped to three RS OFDM symbols are denoted by $I_{cs4}$, $I_{cs5}$, and $I_{cs6}$, three cyclically shifted sequences $r(n, I_{cs4})$, $r(n, I_{cs5})$, and $r(n, I_{cs6})$ can be obtained. The three cyclically shifted sequences are spread by the use of an orthogonal sequence $w^{RS}_i(k)$ having a spreading factor K=3.

An orthogonal sequence index i, a CS index $I_{cs}$, and a resource block index m are parameters required to configure the PUCCH, and are also resources used to identify the PUCCH (or UE). If the number of available cyclic shifts is 12 and the number of available orthogonal sequence indices is 3, PUCCHs for 36 UEs in total can be multiplexed to one resource block.

In the 3GPP LTE, a resource index $n^{(1)}_{PUUCH}$ is defined in order for the UE to obtain the three parameters for configuring the PUCCH. $n^{(1)}_{PUCCH}$ is also called a PUCCH index. The resource index $n^{(1)}_{PUUCH}$ is defined to $n_{CCE}+N^{(1)}$ PUUCH, where $n_{CCE}$ is an index of a first CCE used for transmission of corresponding DCI (i.e., DL resource allocation used to receive DL data mapped to an ACK/NACK signal), and $N^{(1)}_{PUUCH}$ is a parameter reported by a BS to the UE by using a higher-layer message.

Time, frequency, and code resources used for transmission of the ACK/NACK signal are referred to as ACK/NACK resources or PUCCH resources. As described above, an index of a PUCCH resource or the ACK/NACK resource required to transmit the ACK/NACK signal on the PUCCH can be expressed with at least any one of an orthogonal sequence index i, a CS index $I_{cs}$, a resource block index m, and a PUCCH index $n^{(1)}_{PUCCH}$ for obtaining the three indices.

Channel selection is another method for transmitting ACK/NACK. The channel selection is also called ACK/NACK multiplexing. The UE transmits ACK/NACK by selecting one PUCCH resource among a plurality of PUCCH resources. In this case, if ACK/NACK is transmitted using a PUCCH format 1a/1b through a selected PUCCH resource, it is called channel selection using the PUCCH format 1a/1b.

For example, assume that M DL subframes are associated with a UL subframe n, where M=3. Since 3 PDCCHs can be received from 3 DL subframes, the UE can acquire 3 PUCCH resources $n^{(1)}_{PUCCH,0}$, $n^{(1)}_{PUCCH,1}$, $n^{(1)}_{PUCCH,2}$. The conventional PUCCH format 1b can transmit only 2-bit ACK/NACK. However, channel selection can be used to express more ACK/NACK states by linking the allocated PUCCH resources and an actual ACK/NACK signal.

Meanwhile, if it is assumed that M DL subframes are associated with a UL subframe n, ACK/NACK may be mismatched between the BS and the UE due to missing of the DL subframe (or PDCCH).

Assume that M=3, and the BS transmits three DL transport blocks through three DL subframes. The UE misses the PDCCH in the second DL subframe and thus cannot receive a second transport block at all, and can receive only the remaining first and third transport blocks. In this case, if bundling is used, the UE erroneously transmits ACK.

In order to solve this error, a downlink assignment index (DAI) is included in a DL grant on the PDCCH. The DAI indicates an accumulative counter value of the PDCCH which transmits a PDSCH allocated thereto. A value of the 2-bit DAI is increased in an orderly manner starting from 1, and a modulo-4 operation is applicable again from DAI=4. If M=5 and all of 5 DL subframes are scheduled, the DAI can be included in a corresponding PDCCH in the order of DAI=1, 2, 3, 4, 1.

Now, semi-persistent scheduling (SPS) will be described.

In LTE, a higher-layer signal such as radio resource control (RRC) can be used by a BS to report to a UE about specific subframes in which semi-persistent transmission/reception is performed. Examples of a parameter given as the higher layer signal may be a subframe period and an offset value.

The UE recognizes semi-persistent transmission through RRC signaling, and thereafter performs or releases SPS PDSCH reception or SPS PUCCH transmission upon receiving an activation or release signal of SPS transmission through a PDCCH. That is, in a case where the activation or release signal is received through the PDCCH instead of directly performing SPS transmission even if SPS scheduling is assigned through RRC signaling, SRS transmission and reception are performed in a subframe corresponding to an offset and a subframe period allocated through RRC signaling by applying a modulation and coding rate based on modulation and coding scheme (MCS) information and a frequency resource (resource block) based on resource block allocation designated in the PDCCH.

If an SPS release signal is received through the PDCCH, SPS transmission/reception is suspended. Upon receiving a PDCCH including the SPS activation signal, the suspended SPS transmission/reception is resumed by using an MCS and a frequency resource designated in the PDCCH.

The PDCCH for the SPS configuration/release can be called an SPS allocation PDCCH, and a PDCCH for a normal PUSCH can be called a dynamic PDCCH. The UE can validate whether the PDCCH is the SPS allocation PDCCH when the following conditions are satisfied, that is, 1) CRC parity bits derived from a PDCCH payload must be scrambled with an SPS C-RNTI, and 2) a value of a new data indicator field must be '0'. In addition, when each field value of a PDCCH is determined as shown in the field value of Table 6 below with respect to each DCI format, the UE recognizes DCI information of the PDCCH as SPS activation or release.

TABLE 9

| | DCI format 0 | DCI format 1/1A | DCI format 2/2A/2B/2C |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 9 above shows an example of a field value of an SPS allocation PDCCH for validating SPS activation.

TABLE 10

| | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |

TABLE 10-continued

|  | DCI format 0 | DCI format 1A |
|---|---|---|
| Modulation and coding scheme | N/A | set to '11111' |
| Redundancy version | N/A | set to '00' |
| Resource block assignment | N/A | Set to all '1's |

Table 10 above shows an example of a field value of an SPS release PDCCH for validating SPS release.

Now, a carrier aggregation system will be described.

[Carrier Aggregation System]

Figure 8:
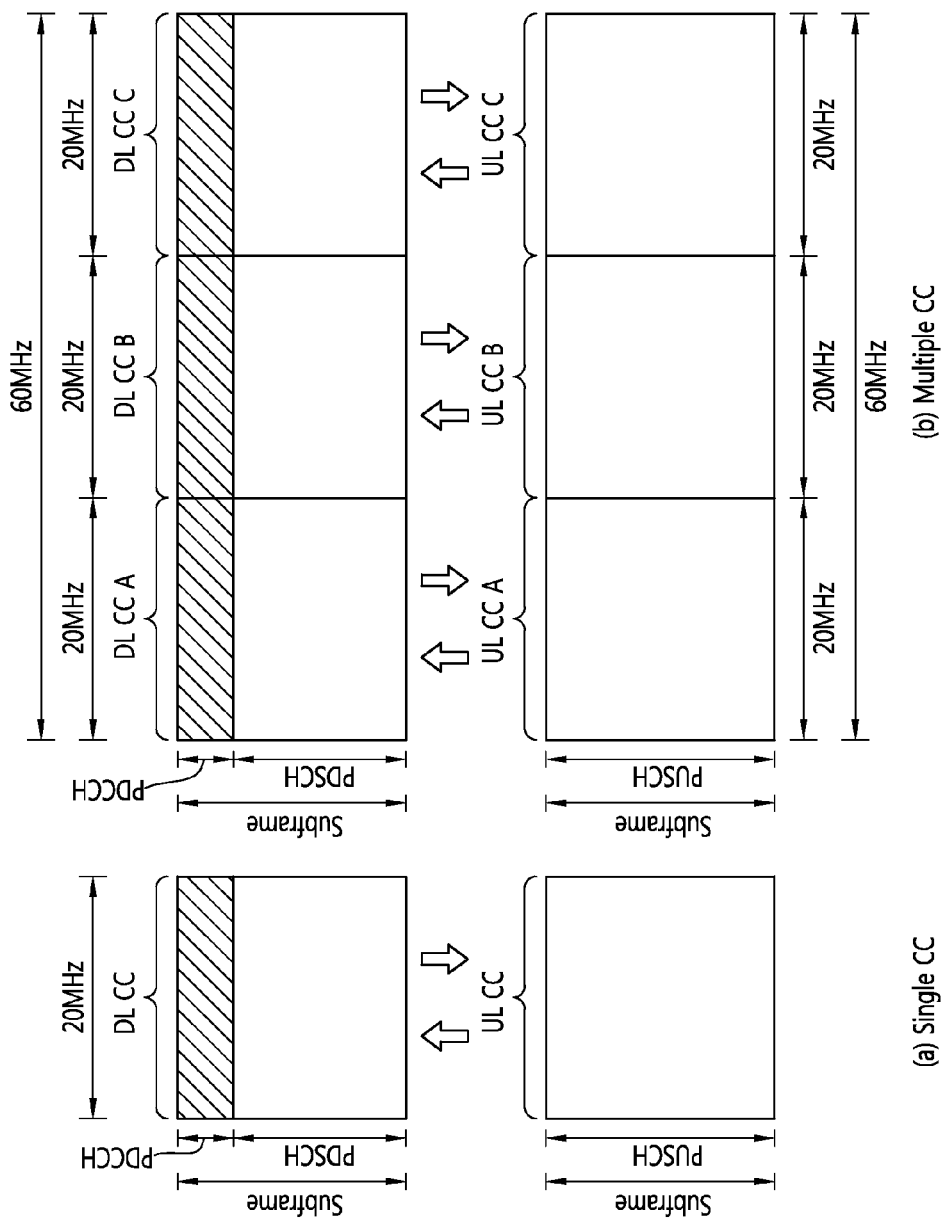
FIG. 8 shows an example of comparing a carrier aggregation system with the conventional single-carrier system.

FIG. 8 shows an example of comparing a carrier aggregation system with the conventional single-carrier system.

Referring to FIG. 8, the single-carrier system supports only one carrier for a UE in an uplink (UL) and a downlink (DL). Although the carrier may have various bandwidths, only one carrier is allocated to the UE. Meanwhile, the multiple-carrier system can assign multiple CCs, i.e., DL CCs A to C and UL CCs A to C, to the UE. A CC implies a carrier used in a carrier aggregation system, and can be simply referred to as a carrier. For example, three 20 MHz CCs can be allocated to the UE to allocate a 60 MHz bandwidth.

The carrier aggregation system can be divided into a contiguous carrier aggregation system in which carriers to be aggregated are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

A system band of a wireless communication system is divided into a plurality of carrier frequencies. Herein, the carrier frequency implies a center frequency of a cell. Hereinafter, the cell may imply a DL frequency resource and a UL frequency resource. Alternatively, the cell may also imply a combination of a DL frequency resource and an optional UL frequency resource. In general, if carrier aggregation (CA) is not considered, UL and DL frequency resources may always exist in pair in one cell.

In order to transmit and receive packet data via a specific cell, the UE first has to complete a configuration of the specific cell. Herein, the configuration implies a state in which system information required for data transmission and reception for the cell is completely received. For example, the configuration may include an overall procedure that requires common physical layer parameters necessary for data transmission and reception, MAC layer parameters, or parameters necessary for a specific operation in an RRC layer. A cell of which configuration is complete is in a state capable of immediately transmitting and receiving a packet upon receiving only information indicating that packet data can be transmitted.

The cell in a state of completing its configuration can exist in an activation or deactivation state. Herein, the activation implies that data transmission or reception is performed or is in a ready state. The UE can monitor or receive a control channel (i.e., PDCCH) and a data channel (i.e., PDSCH) of an activated cell in order to confirm a resource (e.g., frequency, time, etc.) allocated to the UE.

The deactivation implies that data transmission or reception is impossible and measurement or transmission/reception of minimum information is possible. The UE can receive system information (SI) required to receive a packet from a deactivated cell. On the other hand, in order to confirm the resource (e.g., frequency, time, etc.) allocated to the UE, the UE does not monitor or receive a control channel (i.e., PDCCH) and a data channel (i.e., PDSCH) of the deactivated cell.

A cell can be classified into a primary cell, a secondary cell, and a serving cell.

The primary cell implies a cell that operates at a primary frequency. Further, the primary cell implies a cell in which the UE performs an initial connection establishment procedure or a connection re-establishment procedure with respect to the BS or a cell indicated as the primary cell in a handover procedure.

The secondary cell implies a cell that operates at a secondary frequency. Once an RRC connection is established, the secondary cell is used to provide an additional radio resource.

When carrier aggregation is not configured or when the UE cannot provide carrier aggregation, the serving cell is configured with the primary cell. If the carrier aggregation is configured, the term 'serving cell' indicates a cell configured for the UE, and can consist of a plurality of cells. One serving cell may consist of one DL CC or a pair of {DL CC, UL CC}. The plurality of serving cells can be configured with a set consisting of a primary cell and one or a plurality of cells among secondary cells.

A primary component carrier (PCC) denotes a CC corresponding to the primary cell. The PCC is a CC that establishes an initial connection (or RRC connection) with the BS among several CCs. The PCC serves for connection (or RRC connection) for signaling related to a plurality of CCs, and is a CC that manages UE context which is connection information related to the UE. In addition, the PCC establishes a connection with the UE, and thus always exists in an activation state when in an RRC connected mode. A DL CC corresponding to the primary cell is called a DL primary component carrier (DL PCC), and a UL CC corresponding to the primary cell is called a UL primary component carrier (UL PCC).

A secondary component carrier (SCC) implies a CC corresponding to the secondary cell. That is, the SCC is a CC allocated to the UE in addition to the PCC. The SCC is an extended carrier used by the UE for additional resource allocation or the like in addition to the PCC, and can operate either in an activation state or a deactivation state. A DL CC corresponding to the secondary cell is called a DL secondary CC (DL SCC), and a UL CC corresponding to the secondary cell is called a UL secondary CC (UL SCC).

The primary cell and the secondary cell have the following features.

First, the primary cell is used for PUCCH transmission. Second, the primary cell is always activated, whereas the secondary cell relates to a carrier which is activated/deactivated according to a specific condition. Third, when the primary cell experiences a radio link failure (RLF), RRC re-connection is triggered, whereas when the secondary cell experiences the RLF, the RRC re-connection is not triggered. Fourth, the primary cell can change by a handover procedure accompanied by a random access channel (RACH) procedure or security key modification. Fifth, non-access stratum (NAS) information is received through the primary cell. Sixth, the primary cell always consists of a pair of a DL PCC and a UL PCC. Seventh, for each UE, a different CC can be configured as the primary cell. Eighth, a procedure such as reconfiguration, adding, and removal of the primary cell can be performed by an RRC layer. When adding a new secondary cell, RRC signaling can be used for transmission of system information of a dedicated secondary cell.

Regarding a CC constructing a serving cell, a DL CC can construct one serving cell, or the DL CC can be connected to a UL CC to construct one serving cell. However, the serving cell is not constructed only with one UL CC.

Activation/deactivation of a CC is equivalent in concept to activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated between a downlink and an uplink may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC (carrier #0)+20 MHz CC (carrier #1)+20 MHz CC (carrier #2)+20 MHz CC (carrier #3)+5 MHz CC (carrier #4).

As described above, the carrier aggregation system can support a plurality of CCs, that is, a plurality of serving cells, unlike a single carrier system.

The carrier aggregation system can support cross-carrier scheduling. The cross-carrier scheduling is a scheduling method capable of performing resource allocation of a PDSCH transmitted by using a different carrier through a PDCCH transmitted via a specific CC and/or resource allocation of a PUSCH transmitted via another CC other than a CC basically linked to the specific CC. That is, the PDCCH and the PDSCH can be transmitted through different DL CCs, and the PUSCH can be transmitted via a UL CC other than a UL CC linked to a DL CC on which a PDCCH including a UL grant is transmitted. As such, in a system supporting the cross-carrier scheduling, a carrier indicator is required to report a specific DL CC/UL CC used to transmit the PDSCH/PUSCH for which the PDCCH provides control information. A field including the carrier indicator is hereinafter called a carrier indication field (CIF).

The carrier aggregation system supporting the cross-carrier scheduling may include a CIF in the conventional downlink control information (DCI) format. In a system supporting the cross-carrier scheduling, e.g., an LTE-A system, the CIF is added to the conventional DCI format (i.e., the DCI format used in LTE) and thus the number of bits can be extended by 3 bits, and the PDCCH structure can reuse the conventional coding scheme, resource allocation scheme (i.e., CCE-based resource mapping), etc.

Figure 9:
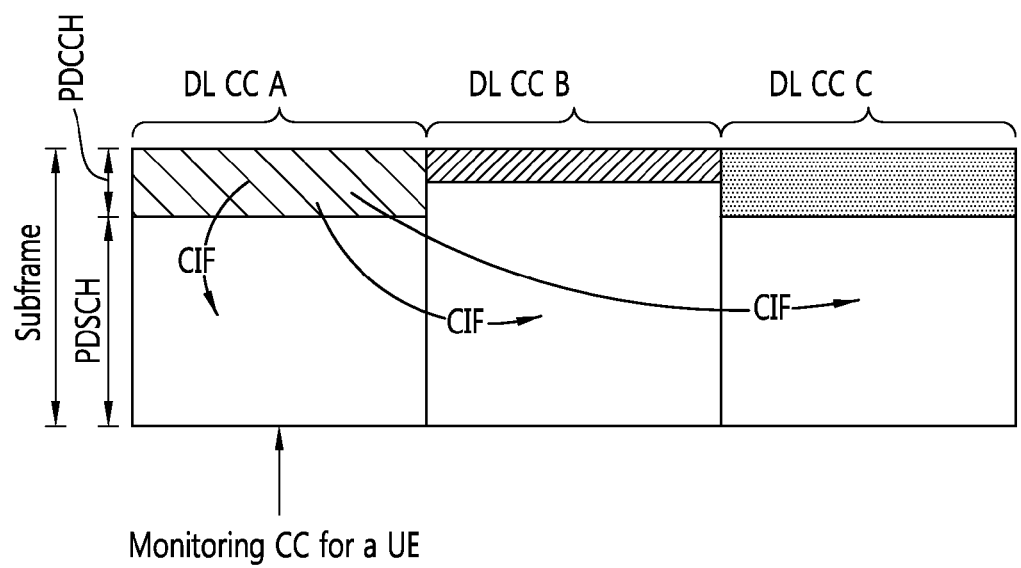
FIG. 9 shows a subframe structure for cross-carrier scheduling in a carrier aggregation system.

FIG. 9 shows a subframe structure for cross-carrier scheduling in a carrier aggregation system.

Referring to FIG. 9, a BS can determine a PDCCH monitoring DL CC set. The PDCCH monitoring DL CC set consists of some DL CCs among all aggregated DL CCs. When the cross-carrier scheduling is configured, a UE performs PDCCH monitoring/decoding only for a DL CC included in the PDCCH monitoring DL CC set. In other words, the BS transmits a PDCCH for a to-be-scheduled PDSCH/PUSCH only via a DL CC included in the PDCCL monitoring DL CC set. The PDCCH monitoring DL CC set can be determined in a UE-specific, UE group-specific, or cell-specific manner.

In the example of FIG. 9, 3 DL CCs (i.e., DL CC A, DL CC B, DL CC C) are aggregated, and the DL CC A is determined as the PDCCH monitoring DL CC. The UE can receive a DL grant for a PDSCH of the DL CC A, the DL CC B, and the DL CC C through the PDCCH. A CIF may be included in DCI transmitted through the PDCCH of the DL CC A to indicate a specific DL CC for which the DCI is provided.

Now, a method for scheduling in a carrier aggregation system will be described according to an embodiment of the present invention.

An FDD frame (type 1) and a TDD frame (type 2) are present in an LTE system. In an LTE-A Rel-10 system, although a plurality of serving cells can be allocated to one UE and transmission and reception can be achieved through a plurality of serving cells, a UE can use only the same type of frames in the plurality of serving cells. In other words, only the serving cells using the same type of frames can be allocated to the same UE. However, due to a necessity of aggregating various idle frequency bands, aggregation between serving cells using different types of frames is considered in a future communication system. Under this premise, there is a need for a scheduling method in a carrier aggregation system.

Figure 10:
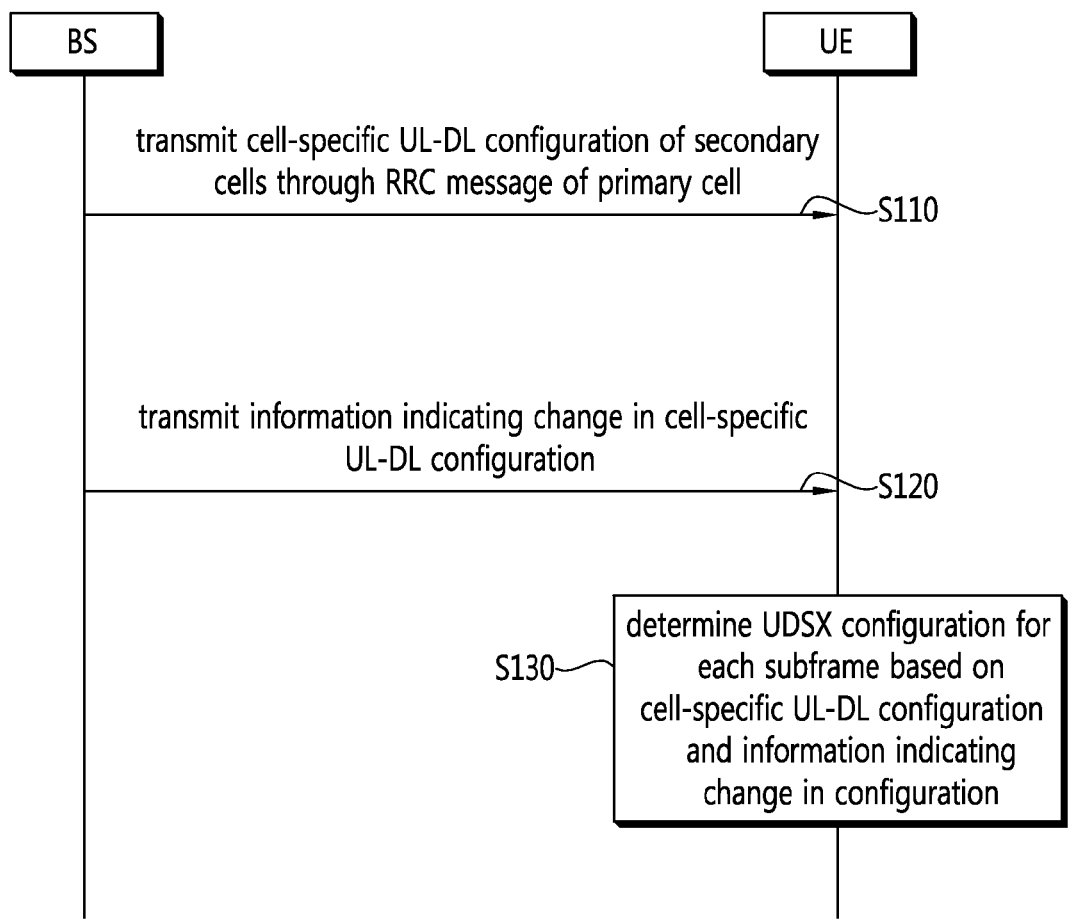
FIG. 10 shows a method for scheduling between a base station (BS) and a user equipment (UE) according to an embodiment of the present invention.

FIG. 10 shows a method for scheduling between a BS and a UE according to an embodiment of the present invention.

Referring to FIG. 10, the BS transmits a UL-DL configuration of secondary cells by using an RRC message of a primary cell (step S110). It is assumed herein that the BS additionally aggregates the secondary cells in a state in which the UE is connected to the primary cell. If an additional secondary cell is aggregated in a state in which the BS aggregates a primary cell and a secondary cell, an RRC message for a UL-DL configuration of the additional secondary cell may be transmitted in pre-aggregated cells.

The primary cell may be a serving cell which uses an FDD frame, and the secondary cells may be at least one serving cell which uses a TDD frame. Alternatively, all cells may be configured with TDD, and in this case, a UL-DL configuration may be different between the primary cell and the secondary cell. A UL-DL configuration of an RRC message is configuration information indicating a specific type of subframe, among a downlink subframe (D), an uplink subframe (U), and a special subframe (S), to which each subframe in one TDD frame belongs as exemplified in Table 2 above. The UL-DL configuration of the RRC message may be given to all secondary cells allocated to the UE, for each secondary cell or each secondary cell group. That is, the UL-DL configuration of the RRC message may be configured differently for each secondary cell, or may be configured equally for at least two secondary cells.

The UL-DL configuration of the RRC message may be the same information as a UL-DL configuration to be broadcast as system information in each secondary cell. A UL-DL configuration which is broadcast in each secondary cell is called a cell-specific UL-DL configuration. The UL-DL configuration included in the RRC message may be the same as the cell-specific UL-DL configuration. If a secondary cell is additionally aggregated in a state in which a UE is connected to the primary cell through a communication channel (e.g., an RRC connected state), receiving of a UL-DL configuration for each subframe of the secondary cell by using an RRC message transmitted through the primary cell is more effective than receiving of a cell-specific UL-DL configuration through the secondary cell. This is because system information of the secondary cell needs to be persistently monitored if the cell-specific UL-DL configuration must be received through the secondary cell.

The BS transmits information indicating a change in a cell-specific UL-DL configuration of the secondary cell through the primary cell (step S120). For example, the information indicating the change in the cell-specific UL-DL configuration of the secondary cell may be a UE-specific UL-DL configuration. The UE-specific UL-DL configuration implies a UL-DL configuration in a TDD frame which applies only to a specific UE. In particular, a UE-specific UL-DL configuration for a serving cell that must receive system information from another serving cell is preferably transmitted together with a cell-specific UL-DL configuration. The UE-specific UL-DL configuration can be commonly applied to all serving cells allocated to the UE.

The UE performs a 'UDSX' configuration on each subframe of the secondary cells on the basis of the cell-specific UL-DL configuration and the information indicating the change in the cell-specific UL-DL configuration (step S130). Herein, the UDSX configuration implies that each of subframes of the secondary cells is configured to an uplink subframe (U), a downlink subframe (D), a special subframe (S), or a unused subframe (X). The UE can communicate with the BS by performing the UDSX configuration of each subframe.

Figure 11:
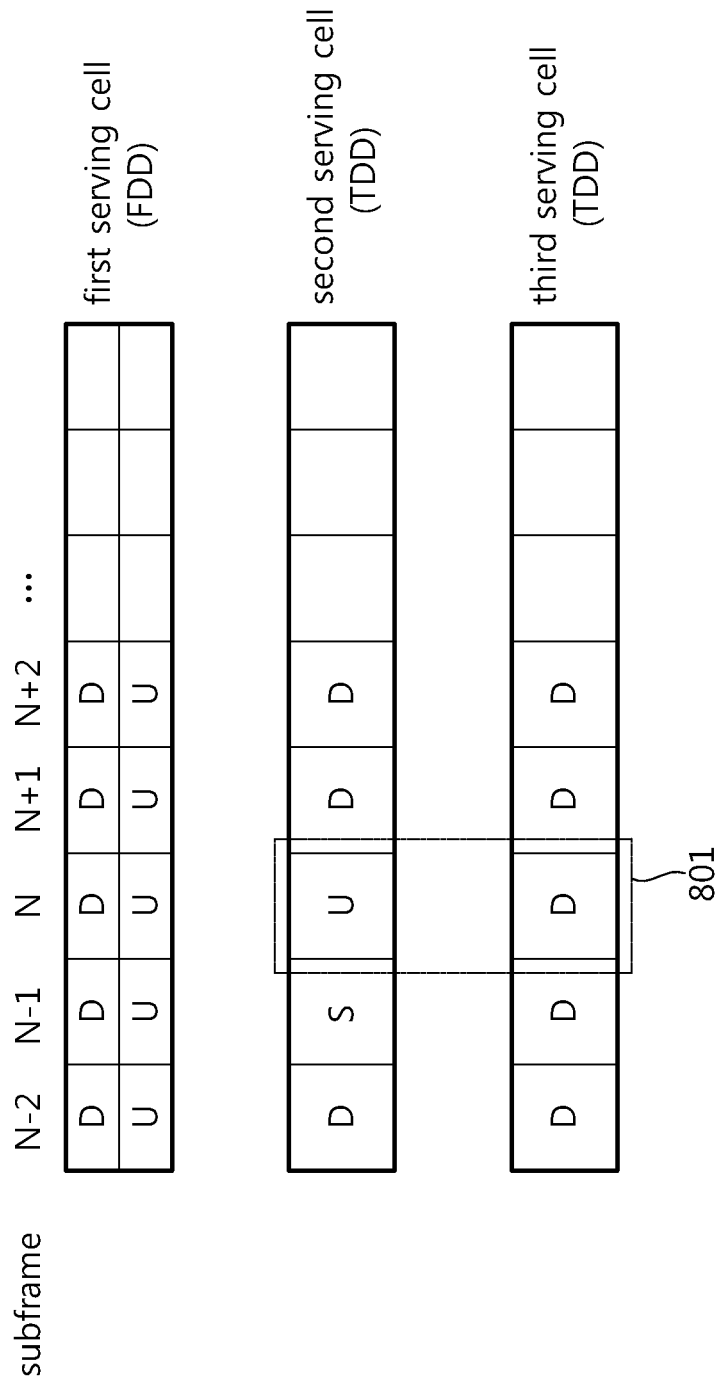
FIG. 11 shows an example of an unused subframe.

FIG. 11 shows an example of an unused subframe.

Referring to FIG. 11, a first serving cell using an FDD frame and second and third serving cells using a TDD frame can be allocated to a UE. Herein, the first serving cell may be a primary cell, and the second and third serving cells may be secondary cells. According to a cell-specific UL-DL configuration on secondary cells (i.e., the second serving cell and the third serving cell), a subframe #N of the second serving cell may be configured to U, and a subframe #N of the third serving cell may be configured to D. In this case, the subframe #N is an unused subframe 801. The UE may not use the unused subframe. A state of the unused subframe which is not used as described above is indicated by X to distinguish it from the existing subframes D, U, and S.

Although it is described in FIG. 11 that the unused subframe is generated because different serving cells have different cell-specific UL-DL configurations for example, the unused subframe may also be generated when a cell-specific UL-DL configuration which is configured for a single serving cell differs from a UE-specific UL-DL configuration for the single serving cell. That is, regarding a specific subframe of a secondary cell, an unused subframe may be generated in which a transmission direction based on a cell-specific UL-DL configuration does not coincide with a UE-specific UL-DL configuration.

The UL-DL configuration of the secondary cells using the TDD frame may be indicated, as described above, through a UL-DL configuration in a unit of subframe set in one frame (e.g., the UL-DL configuration of Table 2), and may also be indicated in a unit of subframe.

Figure 12:
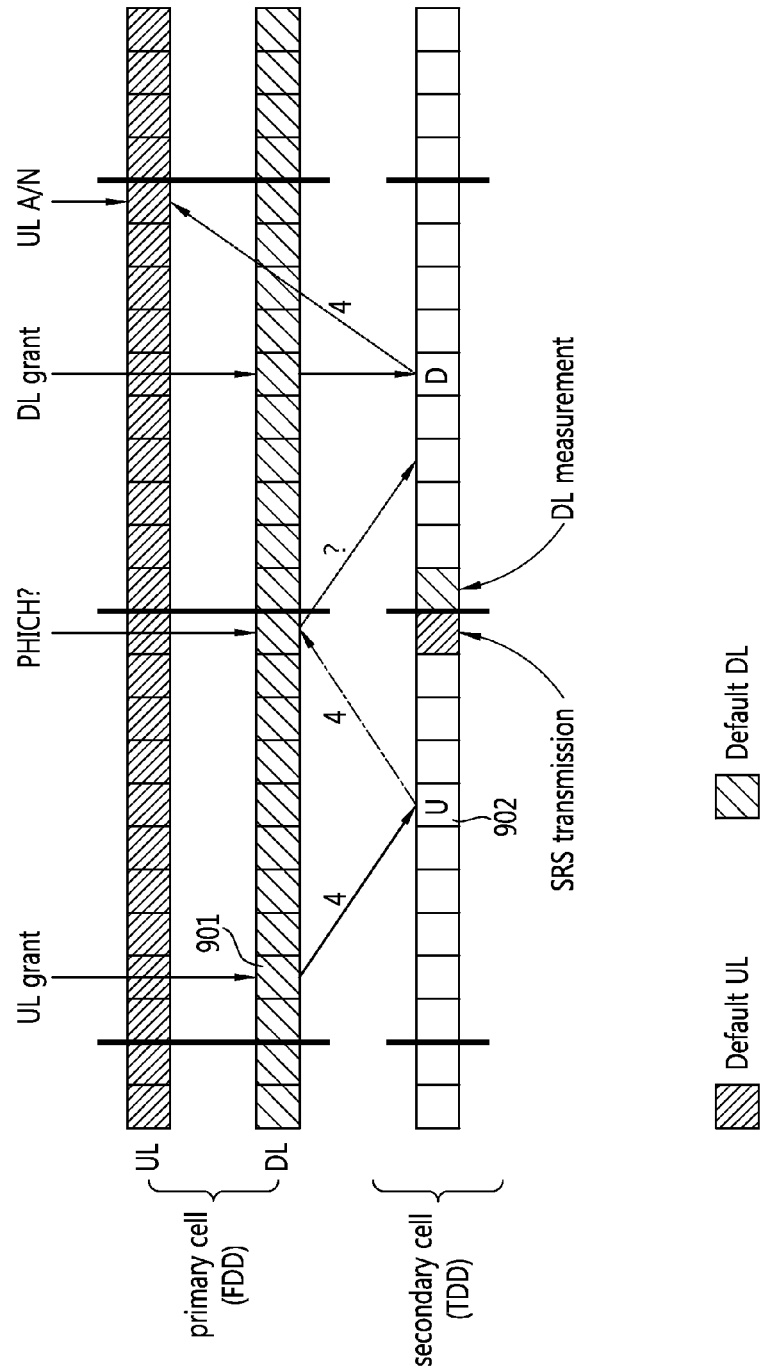
FIG. 12 shows an example of performing a UL-DL configuration of a secondary cell in a unit of subframe.

FIG. 12 shows an example of performing a UL-DL configuration of a secondary cell in a unit of subframe.

Referring to FIG. 12, a primary cell and a secondary cell can be allocated to a UE. In this case, the primary cell may use an FDD frame, and the secondary cell may be a TDD frame.

Preferably, the primary cell maintains backward compatibility for initial cell synchronization and initial access. On the contrary, it is not necessary for the secondary cell to maintain the backward compatibility. Therefore, in terms of a frequency band, the primary cell can be selected from licensed bands of the conventional wireless communication system, and the secondary cell can use an unlicensed band.

Each subframe of the secondary cell may be a flexible subframe which is not determined to any one of subframes U, D, S, and X. In this case, the BS may transmit a PDCCH to the UE (this is called UE-specific L1 signaling) through any subframe 901 of the primary cell. In case of using the UE-specific L1 signaling, the UE can determine a UDSX configuration of a flexible subframe 902 according to whether it is an uplink or a downlink which is scheduled by a DCI format detected through a PDCCH connected to the flexible subframe 902.

That is, if the DCI format indicates a UL grant which triggers the use of a UL subframe or indicates PUSCH transmission caused by a PHICH NACK response, it is recognized that the flexible subframe 902 is used as the UL subframe. On the other hand, if the DCI format indicates a DL grant which triggers the use of a DL subframe caused by the DCI format, it is recognized that the flexible subframe 902 is used as the DL subframe. The flexible subframe and its related UL grant timing and DL grant timing may be configured independently from each other.

Further, FIG. 12 shows a case where a primary cell has a control channel including a grant, and a secondary cell has a data channel. That is, it is exemplified a case where the control channel and the data channel exist in different frequency bands or serving cells. However, the present invention is not limited thereto, and thus can also be applied to a case where the flexible subframe and its related UL grant/DL grant exist in the same serving cell.

If the UE receives information indicating a UDSX configuration (e.g., a UL grant, a DL grant, an indicator directly indicating the ULSX configuration, etc.) in a subframe #n of a primary cell, a subframe of a secondary cell to which the information indicating the UDSX configuration is applied may be a subframe #n+k. That is, an offset value k can be used so that a subframe (of a primary cell) in which the information indicating the UDSX configuration is received is different from a subframe (of a secondary cell) to which the information is applied. By using the offset value, UL/DL switching in the subframe of the secondary cell can be achieved smoothly. The value k may be a predetermined or signaled. In addition, the value k may be commonly applied to D, U, and S or may be applied differently according to D, U, and S.

The present invention is not restricted to a case where all subframes of the secondary cell are flexible subframes. That is, some subframes of the secondary cell may be designated to D (or U) as a default value. For example, in FIG. 12, some subframes of the secondary cell can be designated to D as a default value and thus can be used in DL measurement. In addition, some subframes of the secondary cell may be designated to U as a default value and thus can be used in transmission of sounding reference signal (SRS).

As such, if the some subframes of the secondary cell are designated to D (or U) as a default value, a UDSX configuration may be achieved only for the remaining subframes through a primary cell.

Alternatively, the flexible subframe may be designated to D (or U) as a default value, and a UDSX configuration may change through the primary cell. For example, if the UE fails to receive specific signaling, the flexible subframe may be recognized as a subframe configured to D as a default value, and if the UE receives the specific signaling, the flexible subframe may be changed to a subframe configured to U. In this case, the subframe configured to D as the default value can be changed to U only during a duration of N subframes, and if the duration of N subframes is over, can be restored to D configured as the default value. The value N may be predetermined or may be signaled using RRC.

Although a case where the primary cell uses the FDD frame is assumed in FIG. 12, the present invention is not limited thereto. That is, the primary cell may use a TDD frame in which a UL-DL configuration is semi-persistently fixed. In this case, it may be necessary to configure a new timing relation for control signal transmission. The timing relation may be predetermined or may be signaled by using RRC. In addition, a subframe of the primary cell may be flexibly configured such that backward compatibility is not maintained in all subframes of the primary cell or backward compatibility is maintained only in some subframes. Even in this case, the present invention is also applicable.

In addition, the number of codewords that can be transmitted in a subframe configured to D or U as a default value (i.e., a default subframe) and a flexible subframe may be set differently.

Now, an ACK/NACK transmission method in a carrier aggregation system will be described according to an embodiment of the present invention.

If all serving cells of the carrier aggregation system use FDD, a UL subframe and a DL subframe exist in one frame in a 1:1 manner at the same time point. Meanwhile, in case of using TDD, a ratio of the UL subframe and the DL subframe differs according to a UL-DL configuration.

When using TDD, there is an advantage in that a frequency resource can be effectively utilized according to a UL/DL traffic ratio. However, the conventional TDD has a problem in that a time is required for a UL-DL configuration and a UL-DL reconfiguration, and if there is an existing HARQ process previously executed, it is necessary to wait until the end of the process or to stop the process. Therefore, if the UL/DL traffic ratio changes rapidly, there is a limitation in adaptive operation. Accordingly, a method of dynamically determining a UL-DL configuration of a subframe in a TDD frame is taken into account, and a method of dynamically determining a UL-DL configuration of a TDD frame used in a secondary cell is described with reference to FIG. 12.

Meanwhile, a DL grant/UL grant for scheduling a PDSCH/PUSCH resource is required to operate the conventional DL HARQ or UL HARQ. In addition, a PHICH or PUCCH for transmitting ACK/NACK is required as a response for indicating whether the PDSCH/PUSCH is successfully received. Regarding the scheduled PDSCH/PUSCH, the DL/UL grant and the PHICH are transmitted through a DL subframe at agreed timing, and since the PUCCH is transmitted in a UL subframe, a DL/UL subframe capable of transmitting it must be agreed.

In case of a PHICH which is a response for a PUSCH, a BS for transmitting it performs PUSCH scheduling, and thus whether to perform PUSCH scheduling and the number thereof can be known. Therefore, the PHICH is transmitted by configuring an ACK/NACK payload for an actually scheduled PUSCH.

Meanwhile, regarding a UL ACK/NACK response for a PDSCH, whether to perform PDSCH scheduling and the number thereof may be mismatched between a BS which schedules the PDSCH and a UE which transmits UL ACK/NACK. For example, this is because there is a case where the UE cannot receive a PDCCH for scheduling a PDSCH.

Such a problem may occur in a wireless communication system in which a UL-DL configuration of a secondary cell can be flexibly determined, for example, the wireless communication system described with reference to FIG. 12. Therefore, there is a need for an ACK/NACK transmission method.

Figure 13:
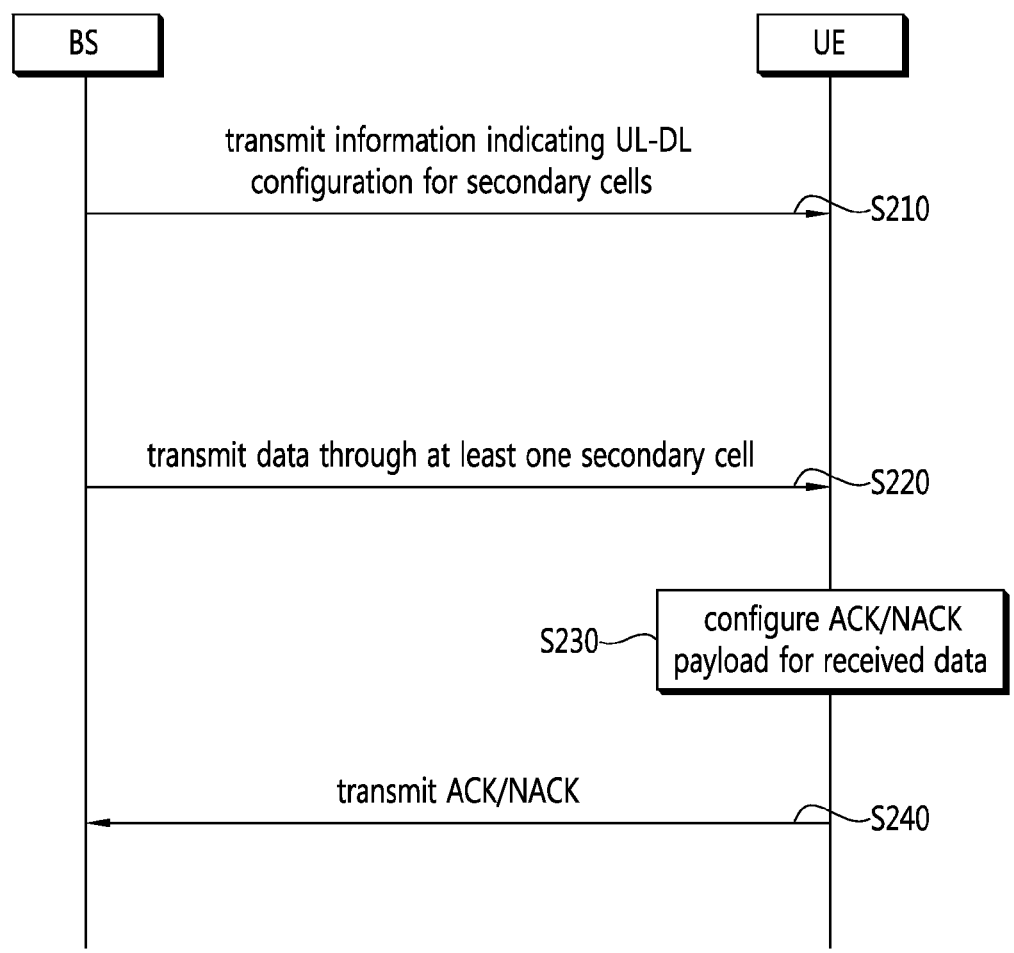
FIG. 13 shows an acknowledgement (ACK)/negative-acknowledgment (NACK) transmission method according to an embodiment of the present invention.

FIG. 13 shows an ACK/NACK transmission method according to an embodiment of the present invention.

Referring to FIG. 13, a BS transmits information indicating a UL-DL configuration for secondary cells to a UE (step S210). The information indicating the UL-DL configuration may be, for example, UL-DL configuration information for each TDD frame of an explicit secondary cell, and may be reported implicitly for each subframe by using a DCI format included in a PDCCH. The information indicating the UL-DL configuration may be transmitted through a primary cell. For example, the information indicating the UL-DL configuration may report a UL-DL configuration for a subframe #N of secondary cells.

The BS transmits data through at least one secondary cell (step S220). In this case, of course, the BS can transmit data through a primary cell. When using the aforementioned example, the BS transmits at least one PDSCH in a subframe #N of the primary cell and the secondary cells.

The UE configures an ACK/NACK payload for received data (step S230). A method of configuring the ACK/NACK payload by the UE is described below in greater detail. An ACK/NACK payload size indicates an information bit size of the ACK/NACK.

The UE feeds back the configured ACK/NACK payload to the BS (step S240). A subframe in which the UE transmits the ACK/NACK payload may be a subframe #M of the primary cell. Herein, the subframe #M may be a subframe separated by a pre-set offset value (e.g., 4) from the subframe #N, or may be a subframe indicated by the BS. In addition, the subframe #M is a UL subframe.

Now, the method of configuring the ACK/NACK payload by the UE is described. The UE can configure the ACK/NACK payload in a UL subframe by using any one of the following methods.

First Embodiment

The UE can configure the ACK/NACK payload according to the number of default DL subframes of each of serving cells corresponding to a UL subframe of a primary cell designated to transmit ACK/NACK, the number of flexible subframes, and a transmission mode of each serving cell. Herein, the default DL subframe implies a subframe configured persistently or semi-persistently as a DL subframe. For example, a subframe configured semi-persistently as a DL subframe in a secondary cell is a default DL subframe.

In addition, the flexible subframe implies a subframe that can be configured dynamically as a UL subframe or a DL subframe. For example, according to whether a PDCCH transmitted in the primary cell includes a UL grant or a DL grant, a subframe of a secondary cell to be scheduled by the PDCCH is determined. The subframe of the secondary cell is a flexible subframe.

The UE determines an ACK/NACK payload size by assuming that flexible subframes are all DL subframes irrespective of whether they are DL subframes or UL subframes, among subframes of each serving cell corresponding to the UL subframe. Since there may be a case where the UE cannot receive a DL grant or a UL grant for scheduling a flexible subframe, the UE determines the ACK/NACK payload size by assuming that all flexible subframes are DL subframes.

For example, there may be a case where the BS transmits a DL grant in a PDCCH for scheduling a flexible subframe, but this may be recognized as a UL grant due to a decoding error of the UE. To handle this situation, the flexible subframe is assumed always as a DL subframe. From the perspective of the UE, when receiving a UL grant for a flexible subframe, the ACK/NACK payload size is determined by assuming that the flexible subframe is always a DL subframe even if the flexible subframe is recognized as a UL subframe.

As described above, the UE determines the ACK/NACK payload size by considering the number of default DL subframes and flexible subframes and a transmission mode of a serving cell including the subframes. If the transmission mode of the serving cell is capable of transmitting up to N codewords in one DL subframe, the ACK/NACK payload size is N×(default DL subframe+flexible subframe).

If the number of transmissible codewords is set differently between a default DL subframe and a flexibly selected DL subframe, the ACK/NACK payload size is (N_default×default DL subframe)+(N_flexible×flexible DL subframe). Herein, N_default is the number of codewords that can be transmitted in a default DL subframe, and N_flexible is the number of codewords that can be transmitted in a flexible DL subframe.

According to this method, the ACK/NACK payload size does not change even if a PDCCH reception error of the UE occurs, so as to be robust to a reception error.

Figure 14:
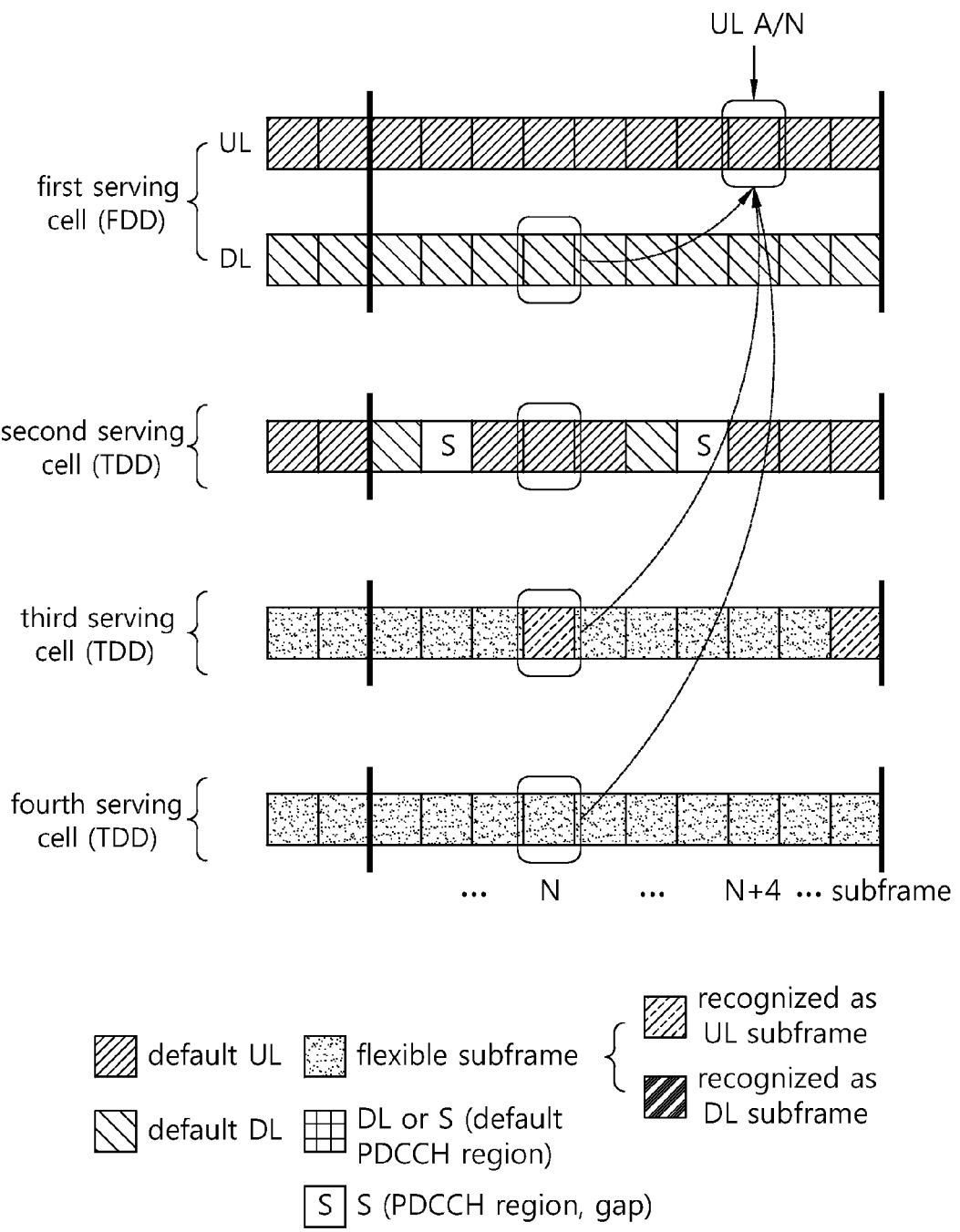
FIG. 14 shows an ACK/NACK transmission method according to a first embodiment.

FIG. 14 shows an ACK/NACK transmission method according to the aforementioned first embodiment.

Referring to FIG. 14, four serving cells can be allocated to a UE. That is, a first serving cell, a second serving cell, a third serving cell, and a fourth serving cell can be allocated to the UE. The first serving cell is a primary cell, and the second to fourth serving cells are secondary cells. The primary cell uses an FDD frame, and the secondary cells use a TDD frame.

If a PDSCH is received in a DL subframe #N of the primary cell, the UE transmits ACK/NACK in a subframe #N+4. Assume that a subframe #N of the second to fourth serving cells is linked to a UL subframe #N+4 of the primary cell. In this case, it is also assumed that the subframe #N of the second serving cell is a default DL subframe, and the UE recognizes the subframe #N of the third serving cell as a flexible UL subframe and recognizes the subframe #N of the fourth serving cell as a flexible DL subframe.

In this case, according to the first embodiment, in a UL subframe #N+4 of the first serving cell, the UE configures an ACK/NACK payload for a DL subframe #N of all of the first serving cell and a subframe #N of the second to fourth serving cells. In this case, of course, an ACK/NACK payload size is determined by considering a transmission mode of each serving cell. In case of a transmission mode in which two codewords are transmitted in one subframe (or PDSCH), a 2-bit ACK/NACK payload is required for each subframe.

Second Embodiment

This method differs from the first embodiment in that an ACK/NACK payload size is determined, except for a subframe recognized as a UL subframe among flexible subframes of each of serving cells linked to a UL subframe of a primary cell for transmitting ACK/NACK. That is, the UE configures an ACK/NACK payload for a default DL subframe of each serving cell and a subframe which is not recognized as a UL subframe (or a subframe recognized as a DL subframe) among flexible subframes. In this case, of course, the ACK/NACK payload size is determined by considering a transmission mode of each serving cell. In other words, the ACK/NACK payload size is equal to the number of bits, which is equal to a product of the maximum number of codewords that can be transmitted in each subframe and a sum of the number of subframes which are not recognized as a UL subframe (or the number of subframes recognized as a DL subframe) by the UE among flexible subframes linked to a UL subframe for transmitting ACK/NACK and the number of default DL subframes. However, if the number of codewords that can be transmitted is set differently in a default DL subframe and a flexibly selected DL subframe, an ACK/NACK payload size is (N_default×default DL subframe)+(N_flexible×subframe not recognized as UL subframe among flexible subframes). This method is performed under a premise that a BS can reliably detect that the UE fails to receive a UL grant and thus cannot transmit a PUSCH.

Figure 15:
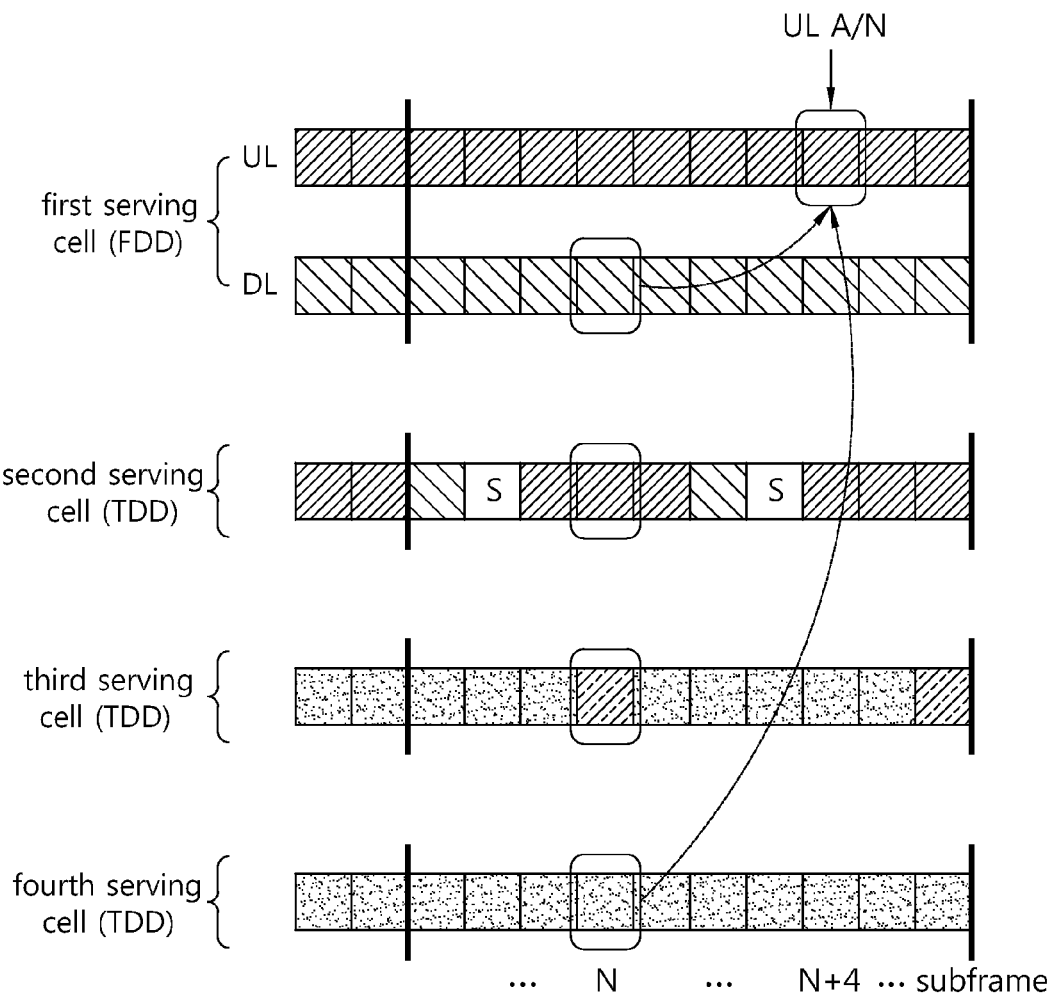
FIG. 15 shows an ACK/NACK transmission method according to a second embodiment.
Figure 15:
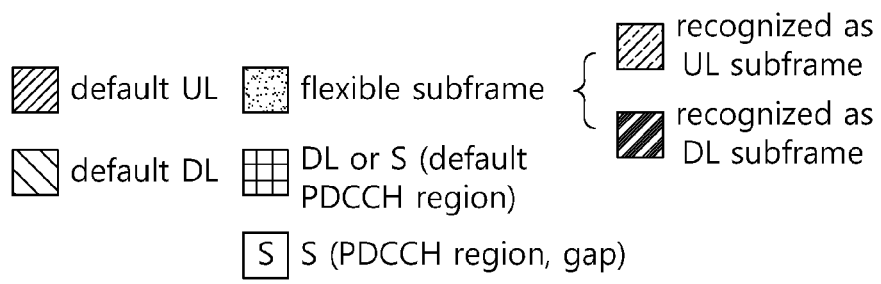

FIG. 15 shows an ACK/NACK transmission method according to the aforementioned second embodiment.

Referring to FIG. 15, a UE configures only an ACK/NACK payload for a DL subframe #N of a first serving cell in a UL subframe #N+4 of a primary cell and for a subframe #N of a fourth serving cell in the same situation as FIG. 13. A subframe #N of a third serving cell is recognized as a UL subframe by the UE. Since a subframe #N of a second serving cell is a default UL subframe, it is excluded when configuring the ACK/NACK payload.

Third Embodiment

In this method, only an ACK/NACK payload for an actually scheduled PDSCH is configured when a UE cannot correctly know the number of actually scheduled PDSCHs by using information such downlink assignment information (DAI). That is, only an ACK/NACK payload is configured for a default DL subframe of each serving cell and a subframe in which a PDSCH is actually scheduled among flexible subframes.

Figure 16:
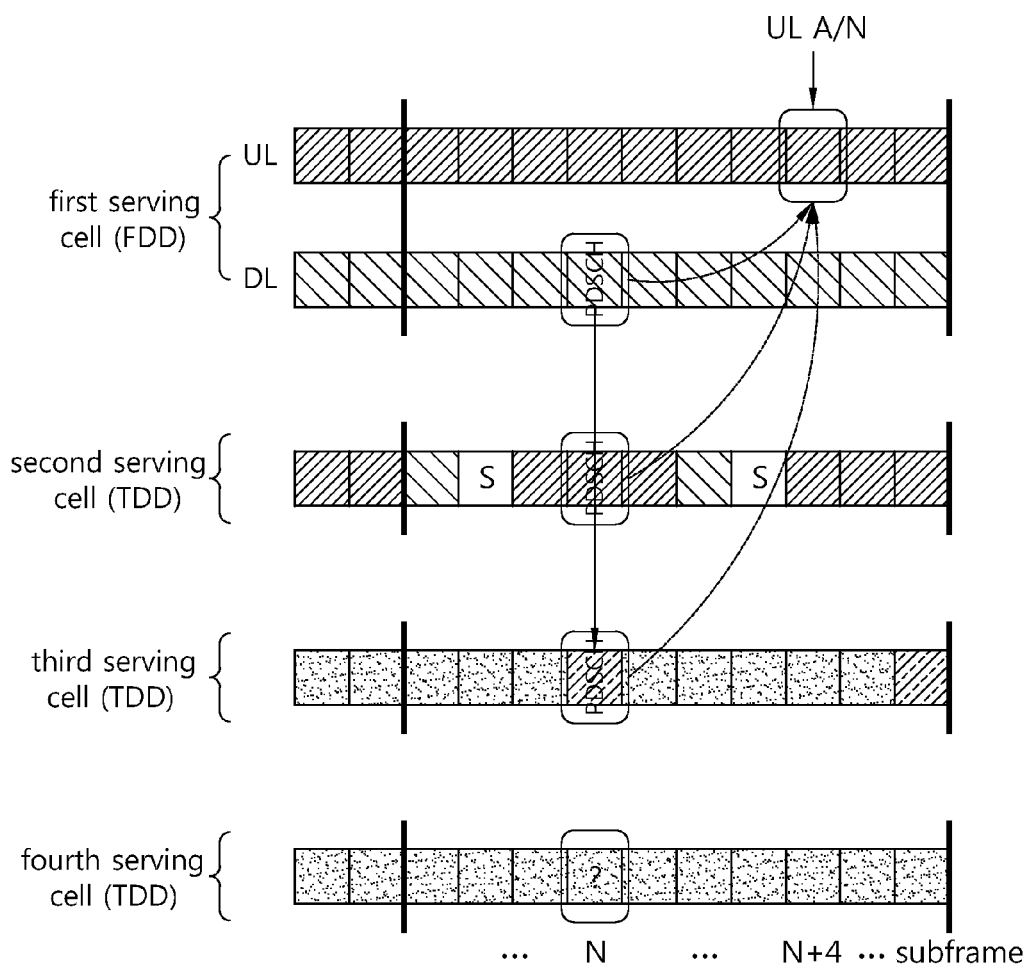
FIG. 16 shows an ACK/NACK transmission method according to a third embodiment.

FIG. 16 shows an ACK/NACK transmission method according to the aforementioned third embodiment.

Referring to FIG. 16, a UE receives a PDSCH actually in a DL subframe #N of a first serving cell, a subframe #N of a second serving cell, and a subframe #N of a third serving cell. Therefore, only an ACK/NACK payload is configured for a subframe #N of the first to third serving cells. A fourth serving cell is excluded since the PDSCH is not received in a subframe #N of the fourth serving cell.

In the first to third embodiments, after configuring the ACK/NACK payload, the UE can transmit some or all ACK/NACK payloads after compressing the ACK/NACK payloads by using bundling or ACK counting according to a channel state or a control channel configuration.

In addition, a PUCCH format and a PUCCH resource used for ACK/NACK transmission can be configured differently according to an ACK/NACK payload size. That is, the PUCCH format and the PUCCH resource used for ACK/NACK transmission are configured differently: i) in a case where a PDCCH for scheduling a PDSCH or a PDCCH for requesting an ACK/NACK response (e.g., DL SPS release PDCCH) is received only in one default DL subframe of a specific serving cell; and ii) in otherwise cases.

For example, in case of receiving the PDCCH for scheduling the PDSCH or for requesting the ACK/NACK response only in one default DL subframe of the primary cell, ACK/NACK can be transmitted by using a dynamic PUCCH format 1a/1b corresponding to a first CCE in which the PDCCH is transmitted. In otherwise cases, ACK/NACK can be transmitted using an ACK/NACK transmission resource (e.g., a PUCCH format 3) capable of transmitting ACK/NACK for a plurality of subframes and a plurality of cells allocated explicitly.

In addition, if there is a PDSCH scheduled with SPS without a PDCCH, an ACK/NACK response for an SPS PDSCH and an ACK/NACK response for a PDSCH scheduled with the PDCCH and for a PDCCH requesting the ACK/NACK response can use a channel selection method for selectively using a dynamic PUCCH format 1a/1b resource corresponding to a first CCE of the PDCCH and an explicit PUCCH format 1a/1b resource for SPS.

When the primary cell is configured with TDD, ACK/NACK can be transmitted by using the following methods.

Only in a default DL subframe among a plurality of DL subframes corresponding to a UL subframe (e.g., a subframe n) for transmitting ACK/NACK, the ACK/NACK is transmitted by using a PUCCH format 1a/1b in a case:

(A) where only one PDSCH scheduled (with SPS) without a PDCCH exists only in a primary cell (PCC) and there is no PDCCH requesting an ACK/NACK response;

(B) where only one PDSCH scheduled with a PDCCH exists only in a primary cell (PCC) and the PDCCH has DAI=1; or (C) where one PDCCH having DAI=1 and requesting an ACK/NACK response (e.g., a DL SPS release PDCCH) exists and there is no PDSCH, and PUCCH format 1a/1b channel selection is used in a case:

(D) where "one PDSCH scheduled (with SPS) without a PDCCH exists" while "'a PDCCH having DAI=1 and requesting an ACK/NACK response (e.g., DL SPS release PDCCH) exists' or 'one PDSCH scheduled with a PDCCH exists only in a PCC and the PDCCH has DAI=1'". That is, a first HARQ-ACK corresponds to a PDSCH transmitted without a PDCCH, a second HARQ-ACK corresponds to a DL SPS release PDCCH or a first codeword of a PDSCH with PDCCH DAI=1, and a third HARQ-ACK corresponds to a second codeword of a PDSCH scheduled by a PDCCH with DAI=1.

Herein, in the cases (A), (B), (C), and (D), a UE cannot receive an ACK/NACK resource indicator (ARI) indicating selection of an ACK/NACK transmission resource (i.e., a PUCCH resource) capable of transmitting ACK/NACK for a plurality of subframes and a plurality of cells. For this operation, the UE recognizes a TPC field as a TPC in a case where a PDCCH schedules a primary cell among PDCCHs having DAI=1 and transmitted in a default DL subframe of the primary cell or in a case where a PDCCH requests ACK/NACK transmission among the PDCCHs having DAI=1 and transmitted in the default DL subframe of the primary cell, and otherwise, the UE recognizes the TPC field as an ARI. Alternatively, the UE recognizes the TPC field as the TPC in a case where the PDCCH schedules the primary cell among the PDCCHs having DAI=1 and scheduling the default DL subframe of the primary cell or a case where the PDCCH requests ACK/NACK transmission among PDCCHs having DAI=1 and transmitted in the default DL subframe of the primary cell, and otherwise, the UE recognizes the TPC field as the ARI.

Such an ACK/NACK resource allocation method is also applicable to a case where only a primary cell is allocated to a UE without a secondary cell and where a default subframe and a flexible subframe exist.

Meanwhile, if a dynamic PUCCH format 1a/1b corresponding to a first CCE in which a PDCCH is transmitted cannot be used when one PDSCH is scheduled in a primary cell, ACK/NACK can be transmitted by using a pre-allocated explicit PUCCH format 1a/1b resource. Herein, the explicit PUCCH format 1a/1b resource may be the same resource as an explicit PUCCH format 1a/1b resource allocated for SPS.

Alternatively, if a dynamic PUCCH format 1a/1b corresponding to a first CCE in which a PDCCH is transmitted cannot be used when one PDSCH is scheduled in a primary cell, ACK/NACK can be transmitted by using a PUCCH format 3. In this case, a TPC field of the PDCCH can be used as an ACK/NACK resource indicator (ARI) indicating one of resources of a pre-set PUCCH format 3.

The aforementioned first to third embodiments are also applicable to one serving cell. For example, if one serving cell using a TDD frame is allocated to the UE and the serving cell can perform a UL-DL configuration dynamically in each subframe, the first to third embodiments can be applied.

Figure 17:
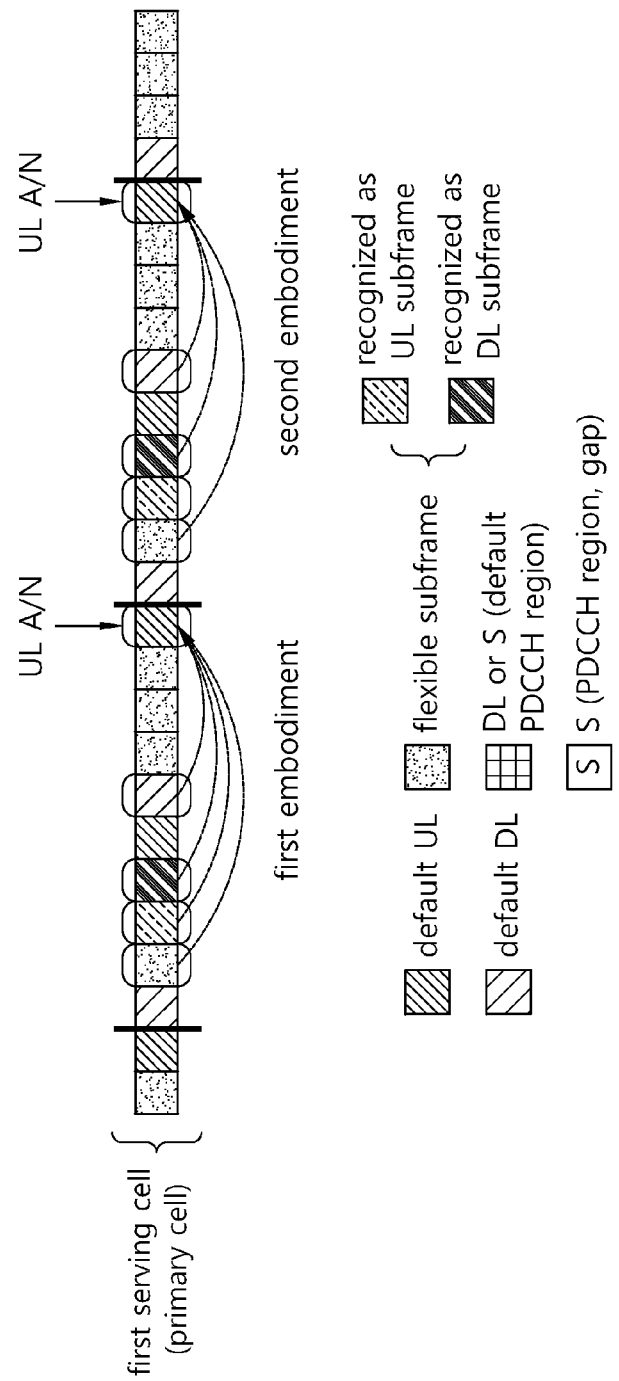
FIG. 17 shows an example of applying a first embodiment or a second embodiment when only one serving cell is allocated to a UE.

FIG. 17 shows an example of applying the first embodiment or the second embodiment when only one serving cell is allocated to a UE.

Referring to FIG. 17, a primary cell can use a TDD frame. ACK/NACK can be transmitted only in a default UL subframe 171. Assume that 4 subframes are linked to the default UL subframe 171. In this case, according to the first embodiment, the UE assigns an ACK/NACK payload for all of the default DL subframe and a flexible subframe.

On the other hand, according to the second embodiment, the UE configures an ACK/NACK payload only for a default DL subframe and subframes excluding a flexible subframe recognized as being used as an actual UL subframe (i.e., subframes recognized as DL subframes among flexible subframes). The ACK/NACK payload is transmitted in the default UL subframe 172.

Although not shown in FIG. 17, according to the third embodiment, the UE can configure an ACK/NACK payload for a subframe in which a PDSCH is actually scheduled among flexible subframes and a default DL subframe.

A case where a plurality of subframes are linked to one UL subframe in a frequency axis is shown in FIG. 14 to FIG. 16, and a case where a plurality of subframes are linked to one UL subframe in a time axis is shown in FIG. 16. The method described with reference to FIG. 14 to FIG. 16 and the method described with reference to FIG. 17 may be used in combination.

In the first to third embodiments, the ACK/NACK payload can be determined in an orderly manner as follows: 1) ACK/NACK can be arranged preferentially in an ascending order of a cell ID of a serving cell to which a subframe belongs, ACK/NACK for a default DL subframe can be preferentially arranged in the same serving cell, and thereafter ACK/NACK for a flexible subframe can be arranged; or 2) ACK/NACK for a default DL subframe is preferentially arranged, and then ACK/NACK for a flexible subframe is arranged. ACK/NACK can be arranged between default DL subframes according to a cell ID, and can be arranged between flexible subframes according to the cell ID; or 3) ACK/NACK can be arranged preferentially in an ascending order of a cell ID of a serving cell to which a subframe belongs, and thereafter, if a scheduling order can be known by a DAI or the like, can be arranged in the same serving cell according to a value of the scheduling order. However, since the value of the scheduling order cannot be known in case of an SPS PDSCH scheduled without a PDCCH, ACK/NACK can be arranged to a fixed position (e.g., a first or last position) in the same cell.

Figure 18:
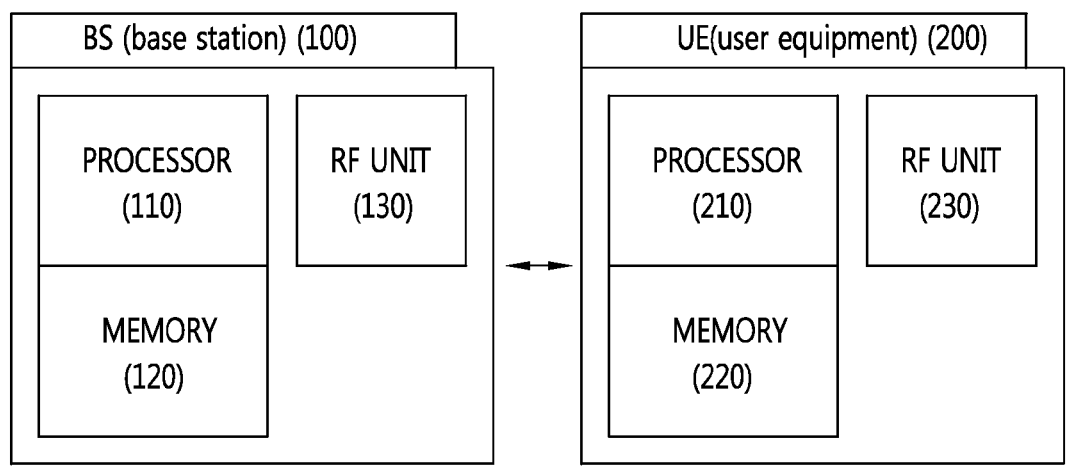
FIG. 18 shows a structure of a BS and a UE according to an embodiment of the present invention.

FIG. 18 shows a structure of a BS and a UE according to an embodiment of the present invention.

A BS 100 includes a processor 110, a memory 120, and a radio frequency (RF) unit 130. The processor 110 implements the proposed functions, procedures, and/or methods. For example, the processor 110 transmits UL-DL configuration information on each subframe of a TDD frame used in secondary cells through a primary cell. Further, the processor 110 transmits DL data through the primary cell and the secondary cell. Furthermore, the processor 110 receives ACK/NACK for the DL data through the primary cell. Upon receiving NACK, the processor 110 may transmit retransmission data. The memory 120 coupled to the processor 110 stores a variety of information for driving the processor 110. The RF unit 130 coupled to the processor 110 transmits and/or receives a radio signal.

A UE 200 includes a processor 210, a memory 220, and an RF unit 230. The processor 210 implements the proposed functions, procedures, and/or methods. For example, the processor 210 receives UL-DL configuration information on first subframes of secondary cells through a primary cell, and receives data in a first subframe of at least one serving cell among the primary cell and the secondary cells. Thereafter, the processor 210 configures ACK/NACK for the received data, and transmits the ACK/NACK trough a second subframe of the primary cell. In this case, the first subframes are linked to the second subframe. In addition, the processor 210 determines a payload size of the ACK/NACK. The ACK/NACK payload size is determined on the basis of the number of default DL subframes among the first subframes, the number of flexible subframes, and a transmission mode of each of serving cells to which the first subframes belong. The memory 220 coupled to the processor 210 stores a variety of information for driving the processor 210. The RF unit 230 coupled to the processor 210 transmits and/or receives a radio signal.

The processors 110 and 210 may include an application-specific integrated circuit (ASIC), a separate chipset, a logic circuit, a data processing unit, and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include one or more antennas for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for transmitting acknowledgement/not-acknowledgement (ACK/NACK) of a user equipment in a wireless communication system, the method comprising:

receiving uplink-downlink (UL-DL) configuration information for a plurality of subframes of a secondary cell via a primary cell;

receiving data in at least one subframe among the plurality of subframes of the secondary cell;

configuring an ACK/NACK for the received data; and transmitting the ACK/NACK through a UL subframe of the primary cell, wherein the plurality of subframes of the secondary cell correspond to the UL subframe of the primary cell, wherein each of the plurality of subframes is any one of a flexible subframe and a default DL subframe fixed to a DL subframe, and the flexible subframe is a subframe that can be configured as a UL subframe or a DL subframe by the UL-DL configuration information, wherein an ACK/NACK payload size indicating an information bit size of the ACK/NACK is determined on the basis of the number of default DL subframes, the number of flexible subframes, and a transmission mode of the plurality of subframes, wherein the primary cell uses a frequency division duplex (FDD) frame and the secondary cell uses a time division duplex (TDD) frame, wherein the primary cell which uses the FDD frame is aggregated with the secondary cell which uses the TDD frame, and wherein the receiving UL-DL configuration information includes receiving the UL-DL configuration for the plurality of subframes of the secondary cell which uses the TDD frame via the primary cell which uses the FDD frame.

2. The method of claim 1, wherein the ACK/NACK payload size is the number of bits, which is equal to a product of the maximum number of codewords that can be transmitted in each subframe and a sum of the number of default DL subframes and the total number of flexible subframes included in the plurality of subframes.

3. The method of claim 1, wherein the ACK/NACK payload size is the number of bits, which is equal to a product of the maximum number of codewords that can be transmitted in each subframe and a sum of the number of default DL subframes and the number of default DL subframes recognized by the user equipment as a DL subframe among flexible subframes included in the plurality of subframes.

4. The method of claim 1, wherein the ACK/NACK payload size is the number of bits, which is equal to a sum of a product of the total number of flexible subframes included in the plurality of subframes and the maximum number of codewords that can be transmitted in the flexible subframe and a product of the number of default DL subframes included in the plurality of subframes and the total number of codewords that can be transmitted in the default DL subframe.

5. The method of claim 1, wherein the primary cell performs an initial connection establishment procedure or a connection re-establishment procedure with respect to a base station.

6. The method of claim 1, wherein if semi-persistently scheduled data is received only in one default DL subframe among the plurality of subframes, the ACK/NACK is transmitted using a physical uplink control channel (PUCCH) format 1a or 1b.

7. The method of claim 1, wherein if scheduled data is received through a physical downlink control channel (PDCCH) only in one default DL subframe among the plurality of subframes and a downlink assignment index (DAI) included in the PDCCH is 1, the ACK/NACK is transmitted using a PUCCH format 1a or 1b.

8. The method of claim 1, wherein if only a PDCCH requesting an ACK/NACK response is received only in one default DL subframe among the plurality of subframes and a DAI included in the PDCCH is 1, the ACK/NACK is transmitted using a PUCCH format 1a or 1b.

9. The method of claim 7 or 8, wherein if data semi-persistently scheduled without a corresponding PDCCH is further received in one default DL subframe among the plurality of subframes, the ACK/NACK is transmitted using channel selection which uses a PUCCH format 1a or 1b.

10. The method of claim 1, wherein the FDD frame performs DL transmission and UL transmission in different frequency bands.

11. The method of claim 1, wherein the TDD frame performs DL transmission and UL transmission in the same frequency band at different times.

12. A user equipment comprising:
a radio frequency (RF) unit for transmitting and receiving a radio signal; and
a processor coupled to the RF unit,
wherein the processor is configured to:
receive UL-DL configuration information for a plurality of subframes of a secondary cell via a primary cell,
receive data in at least one subframe among the plurality of subframes of the secondary cell,
configure an ACK/NACK for the received data, and
transmit the ACK/NACK through a UL subframe of the primary cell,
wherein the plurality of subframes of the secondary cell correspond to the UL subframe of the primary cell,
wherein each of the plurality of subframes of the secondary cell is any one of a flexible subframe and a default DL subframe fixed to a DL subframe, and the flexible subframe is a subframe that can be configured as a UL subframe or a DL subframe by the UL-DL configuration information,
wherein an ACK/NACK payload size indicating an information bit size of the ACK/NACK is determined on the basis of the number of default DL subframes, the number of flexible subframes, and a transmission mode of the plurality of subframes,
wherein if the primary cell uses a frequency division duplex (FDD) frame and the secondary cell uses a time division duplex (TDD) frame,
wherein the primary cell which uses the FDD frame is aggregated with the secondary cell which uses the TDD frame, and
wherein the reception of the UL-DL configuration information by the processor includes receiving the UL-DL configuration for the plurality of subframes of the secondary cell which uses the TDD frame via the primary cell which uses the FDD frame.

13. The apparatus of claim 12, wherein the ACK/NACK payload size is the number of bits, which is equal to a product of the maximum number of codewords that can be transmitted in each subframe and a sum of the number of default DL subframes and the total number of flexible subframes included in the plurality of subframes.

14. The apparatus of claim 12, wherein the ACK/NACK payload size is the number of bits, which is equal to a product of the maximum number of codewords that can be transmitted in each subframe and a sum of the number of default DL subframes and the number of default DL subframes recognized by the user equipment as a DL subframe among flexible subframes included in the plurality of subframes.

15. The apparatus of claim 12, wherein the ACK/NACK payload size is the number of bits, which is equal to a sum of a product of the total number of flexible subframes included in the plurality of subframes and the maximum number of codewords that can be transmitted in the flexible subframe and a product of the number of default DL subframes included in the plurality of subframes and the total number of codewords that can be transmitted in the default DL subframe.

16. The apparatus of claim 12, wherein the primary cell performs an initial connection establishment procedure or a connection re-establishment procedure with respect to a base station.

17. The apparatus of claim 12, wherein if semi-persistently scheduled data is received only in one default DL subframe among the plurality of subframes, the ACK/NACK is transmitted using a physical uplink control channel (PUCCH) format 1a or 1b.

18. The apparatus of claim 12, wherein if scheduled data is received through a physical downlink control channel (PDCCH) only in one default DL subframe among the plurality of subframes and a downlink assignment index (DAI) included in the PDCCH is 1, the ACK/NACK is transmitted using a PUCCH format 1a or 1b.

19. The apparatus of claim 12, wherein if only a PDCCH requesting an ACK/NACK response is received only in one default DL subframe among the plurality of subframes and a DAI included in the PDCCH is 1, the ACK/NACK is transmitted using a PUCCH format 1a or 1b.

* * * * *